US009900891B1

(12) United States Patent
Islam et al.

(10) Patent No.: US 9,900,891 B1
(45) Date of Patent: Feb. 20, 2018

(54) FALLBACK BEAM SELECTION PROCEDURE DURING FAILURE OF BEAM CHANGE INSTRUCTION RECEPTION

(71) Applicant: QUALCOMM Incorporated, San Diego, CA (US)

(72) Inventors: Muhammad Nazmul Islam, Edison, NJ (US); Junyi Li, Chester, NJ (US); Tao Luo, San Diego, CA (US); Bilal Sadiq, Basking Ridge, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/685,872

(22) Filed: Aug. 24, 2017

Related U.S. Application Data

(60) Provisional application No. 62/436,966, filed on Dec. 20, 2016.

(51) Int. Cl.
| | |
|---|---|
| *H04W 4/00* | (2009.01) |
| *H04W 72/04* | (2009.01) |
| *H04W 76/04* | (2009.01) |
| *H04L 5/00* | (2006.01) |
| *H04W 16/28* | (2009.01) |
| *H04W 88/02* | (2009.01) |
| *H04W 88/08* | (2009.01) |

(52) U.S. Cl.
CPC ......... *H04W 72/046* (2013.01); *H04L 5/0048* (2013.01); *H04L 5/0055* (2013.01); *H04W 16/28* (2013.01); *H04W 72/042* (2013.01); *H04W 76/046* (2013.01); *H04W 88/02* (2013.01); *H04W 88/08* (2013.01)

(58) Field of Classification Search
CPC . H04W 72/046; H04W 76/046; H04W 16/28; H04W 72/042; H04W 88/02; H04W 88/08; H04L 5/0055; H04L 5/0048
See application file for complete search history.

(56) References Cited

U.S. PATENT DOCUMENTS

| 9,571,171 B2 | 2/2017 | Kim et al. |
| 2016/0065284 A1 | 3/2016 | Yu et al. |

(Continued)

FOREIGN PATENT DOCUMENTS

WO    2016198123  A1    12/2016

*Primary Examiner* — Clemence Han
(74) *Attorney, Agent, or Firm* — Arent Fox LLP

(57) ABSTRACT

In a process of beam change, the base station transmits a beam change instruction to a user equipment (UE) to indicate that the base station will change from a current beam to another beam, but the UE may not successfully receive the beam change instruction. The apparatus may be a base station that is configured to address such issues. The base station determines to change from a first beam to a second beam. The base station transmits, to a UE, a beam change instruction to indicate the determination to change to the second beam upon the determination to change to the second beam. The base station determines whether the UE has received the beam change instruction. The base station selects a third beam to communicate with the UE when the base station determines that the UE has not received the beam change instruction, wherein the third beam is a predefined beam.

30 Claims, 16 Drawing Sheets

(56) References Cited

U.S. PATENT DOCUMENTS

| | | | |
|---|---|---|---|
| 2016/0183234 A1* | 6/2016 | Sung | H04W 72/046 |
| | | | 370/329 |
| 2016/0190686 A1 | 6/2016 | Gao et al. | |
| 2016/0353510 A1* | 12/2016 | Zhang | H04L 43/16 |
| 2017/0155432 A1* | 6/2017 | Kim | H04B 7/0408 |
| 2017/0188252 A1* | 6/2017 | Miao | H04W 24/10 |
| 2017/0207843 A1* | 7/2017 | Jung | H04B 7/0632 |

\* cited by examiner

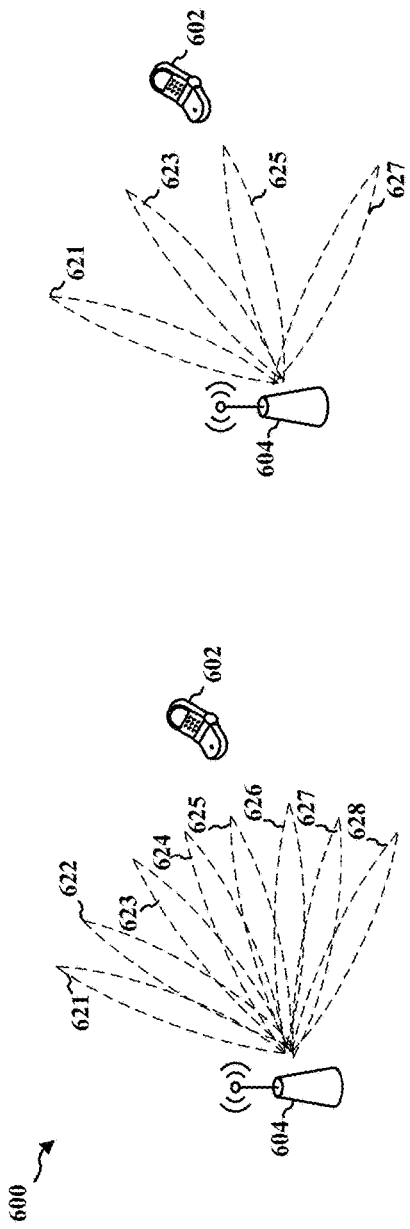
FIG. 6A
FIG. 6B
FIG. 6C
FIG. 6D

FALLBACK BEAM SELECTION PROCEDURE DURING FAILURE OF BEAM CHANGE INSTRUCTION RECEPTION

CROSS-REFERENCE TO RELATED APPLICATION(S)

This application claims the benefit of U.S. Provisional Application Ser. No. 62/436,966, entitled "FALLBACK BEAM SELECTION PROCEDURE DURING FAILURE OF BEAM CHANGE INSTRUCTION RECEPTION" and filed on Dec. 20, 2016, which is expressly incorporated by reference herein in its entirety.

BACKGROUND

Field

The present disclosure relates generally to communication systems, and more particularly, to beam selection in wireless communication between a user equipment and a base station.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

With a beam-forming technique, a base station may select one of beams pointing to different directions to communicate the selected beam. After selection of the beam, an optimal beam may change, and thus the base station may determine to change from a current beam to another beam. In a process of beam change, the base station transmits a beam change instruction to a user equipment (UE) to indicate that the base station will change from a current beam to another beam. There may be situations where the UE cannot successfully receive the beam change instruction. When the base station determines that the UE has not successfully received the beam change instruction, the base station may select a fallback beam instead to communicate with the UE.

In an aspect of the disclosure, a method, a computer-readable medium, and an apparatus are provided. The apparatus may be a base station. The base station determines to change from a first beam to a second beam. The base station transmits, to a UE, a beam change instruction to indicate the determination to change to the second beam upon the determination to change to the second beam. The base station determines whether the UE has received the beam change instruction. The base station selects a third beam to communicate with the UE when the base station determines that the UE has not received the beam change instruction, wherein the third beam is a predefined beam.

In an aspect, the apparatus may be a base station. The base station may include means for determining to change from a first beam to a second beam. The base station may include means for transmitting, to a UE, a beam change instruction to indicate the determination to change to the second beam upon the determination to change to the second beam. The base station may include means for determining whether the UE has received the beam change instruction. The base station may include means for selecting a third beam to communicate with the UE when the base station determines that the UE has not received the beam change instruction, wherein the third beam is a predefined fallback beam.

In an aspect, the apparatus may be a base station including a memory and at least one processor coupled to the memory. The at least one processor may be configured to: determine to change from a first beam to a second beam, transmit, to a UE, a beam change instruction to indicate the determination to change to the second beam upon the determination to change to the second beam, determine whether the UE has received the beam change instruction, and select a third beam to communicate with the UE when the base station determines that the UE has not received the beam change instruction, wherein the third beam is a predefined beam.

In an aspect, a computer-readable medium storing computer executable code, for a UE, includes code to: determine to change from a first beam to a second beam, transmit, to a UE, a beam change instruction to indicate the determination to change to the second beam upon the determination to change to the second beam, determine whether the UE has received the beam change instruction, and select a third beam to communicate with the UE when the base station determines that the UE has not received the beam change instruction, wherein the third beam is a predefined beam.

In an aspect of the disclosure, a method, a computer-readable medium, and an apparatus are provided. The apparatus may be a UE. The UE utilizes a first UE beam to communicate with a base station that is configured to use a first beam of the base station. The UE determines whether the UE has lost communication with the base station. The UE determines that the base station is not configured with a second beam of the base station when the UE determines that the UE has lost communication. The UE selects a third UE beam to communicate with the base station via a third beam of the base station, in response to determining that the base station is not configured with the second beam of the base station, wherein the third beam is a predefined beam.

In an aspect, the apparatus may be a UE. The base station may include means for utilizing a first UE beam to communicate with a base station that is configured to use a first beam of the base station. The base station may include means for determining whether the UE has lost communication with the base station. The base station may include means for determining that the base station is not configured with a second beam of the base station when the UE determines that the UE has lost communication. The base station may include means for selecting a third UE beam to communicate with the base station via a third beam of the base station, in response to determining that the base station is not configured with the second beam of the base station, wherein the third beam is a predefined beam.

In an aspect, the apparatus may be a UE including a memory and at least one processor coupled to the memory. The at least one processor may be configured to: utilize a first UE beam to communicate with a base station that is configured to use a first beam of the base station, determine whether the UE has lost communication with the base station, determine that the base station is not configured with a second beam of the base station when the UE determines that the UE has lost communication, and select a third UE beam to communicate with the base station via a third beam of the base station, in response to determining that the base station is not configured with the second beam of the base station, wherein the third beam is a predefined beam.

In an aspect, a computer-readable medium storing computer executable code, for a UE, includes code to: utilize a first UE beam to communicate with a base station that is configured to use a first beam of the base station, determine whether the UE has lost communication with the base station, determine that the base station is not configured with a second beam of the base station when the UE determines that the UE has lost communication, and select a third UE beam to communicate with the base station via a third beam of the base station, in response to determining that the base station is not configured with the second beam of the base station, wherein the third beam is a predefined beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6A through 6D illustrate diagrams of a wireless communications system.

DETAILED DESCRIPTION

Figure 1:
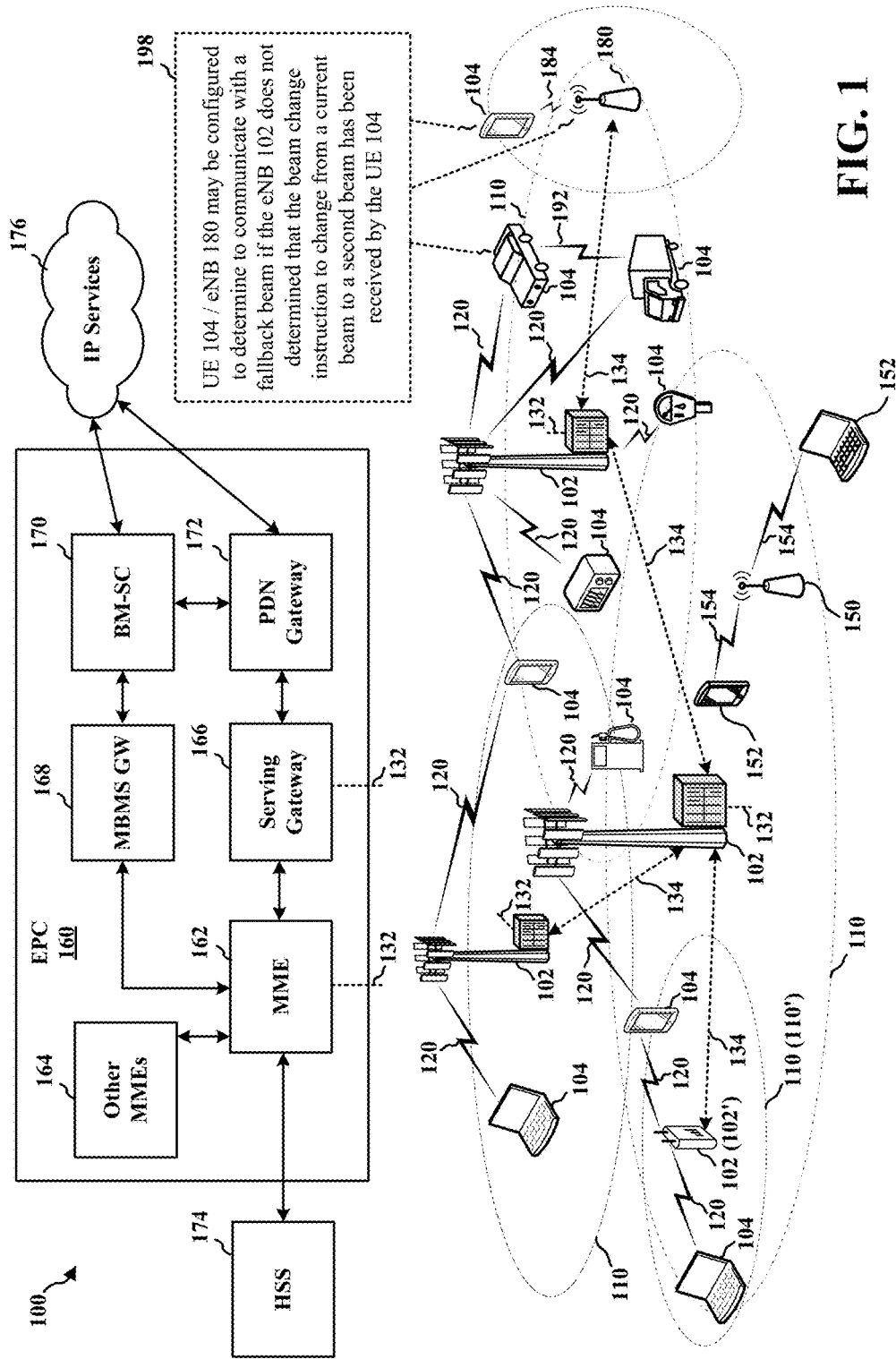
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (MMW) frequencies and/or near MMW frequencies in communication with the UE 104. When the gNB 180 operates in MMW or near MMW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near MMW may extend down to a frequency of 3 GHz with a wavelength of 100 millimeters. The super high frequency (SHF) band extends between 3 GHz and 30 GHz, also referred to as centimeter wave. Communications using the MMW/near MMW radio frequency band has extremely high path loss and a short range. The MMW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/eNB 180 may be configured to determine to communicate with a fallback beam if the eNB 180 does not determined that the beam change instruction to change from a current beam to a second beam has been received by the UE 104 (198).

Figure 2:
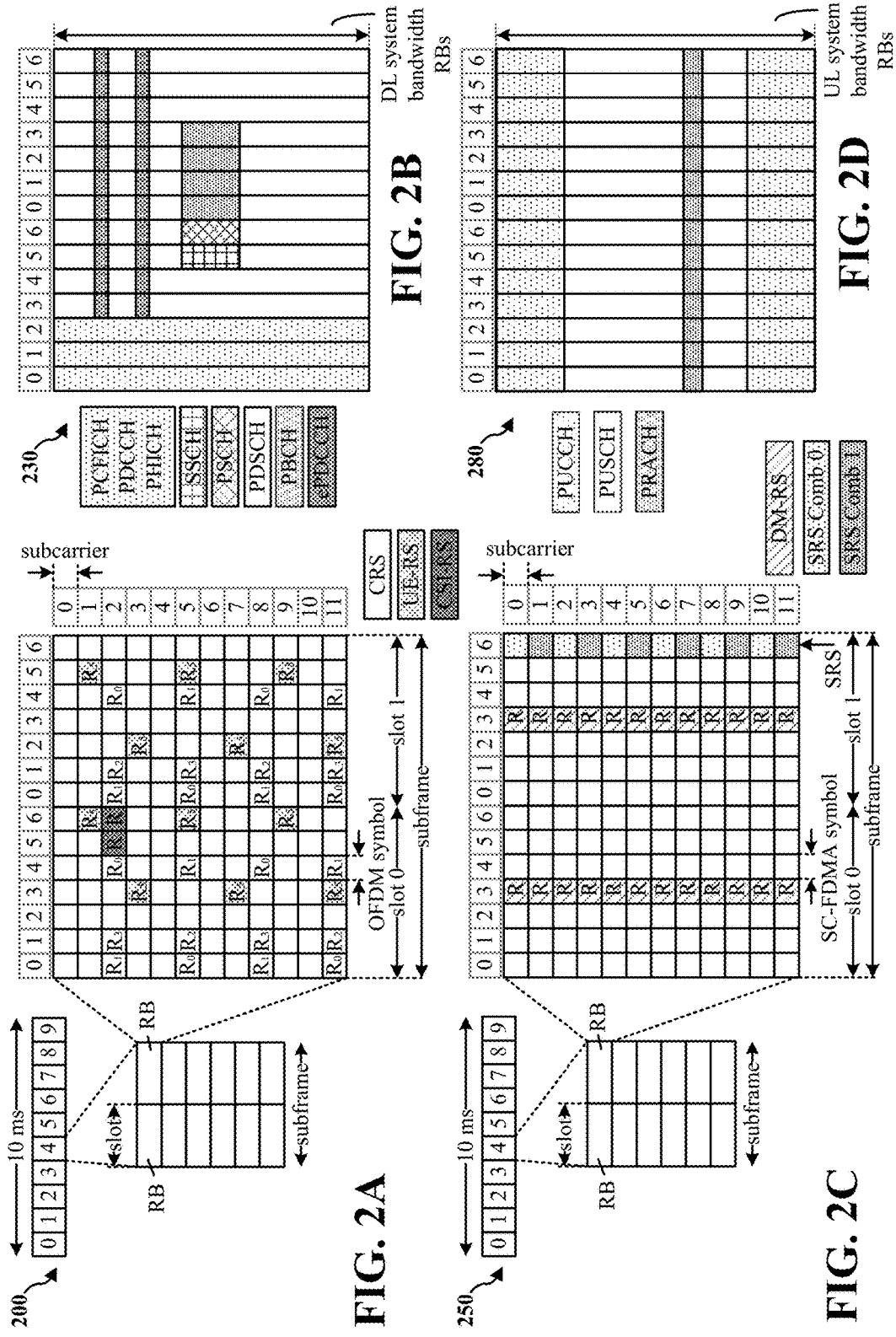
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive sub carriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DMRS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
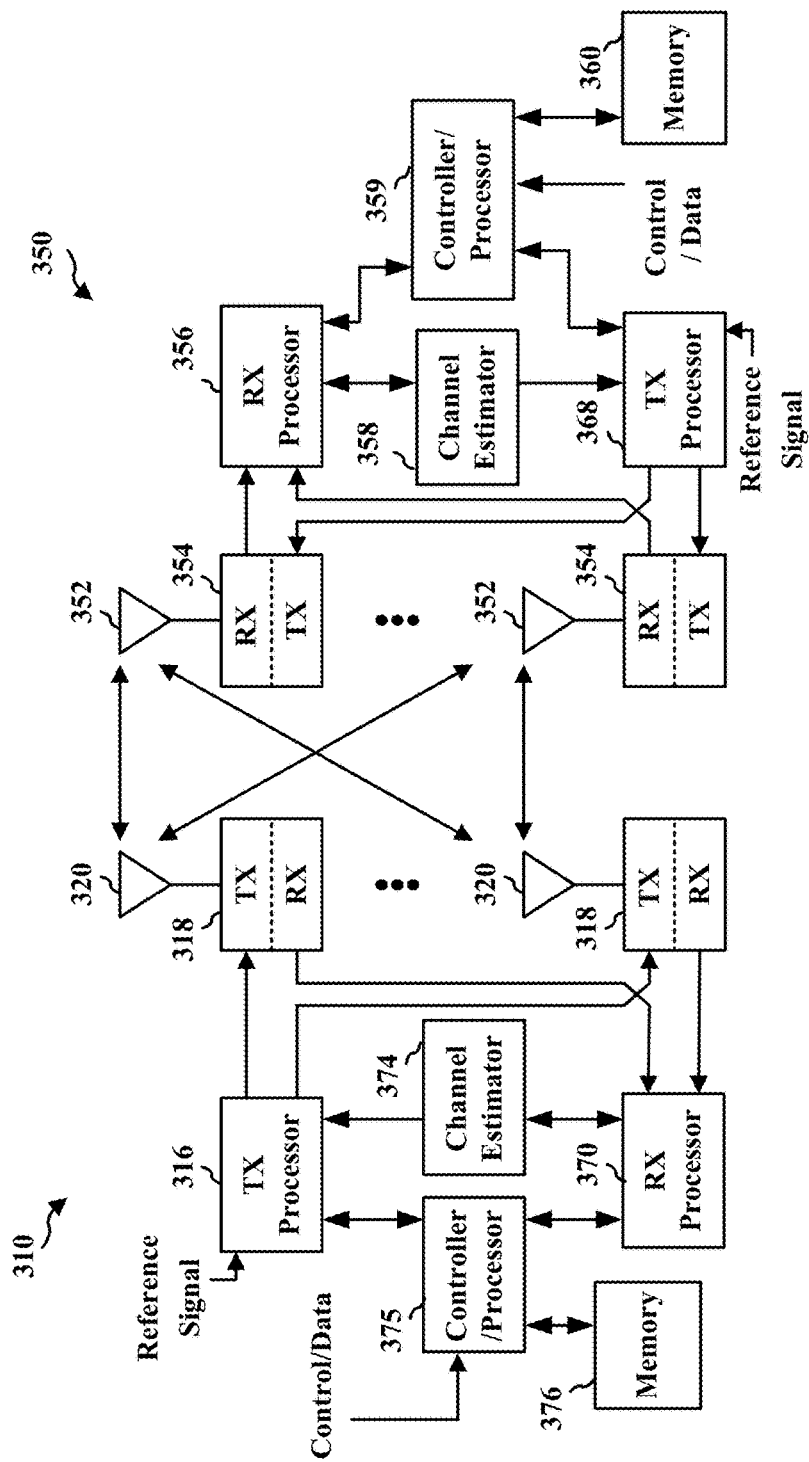
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
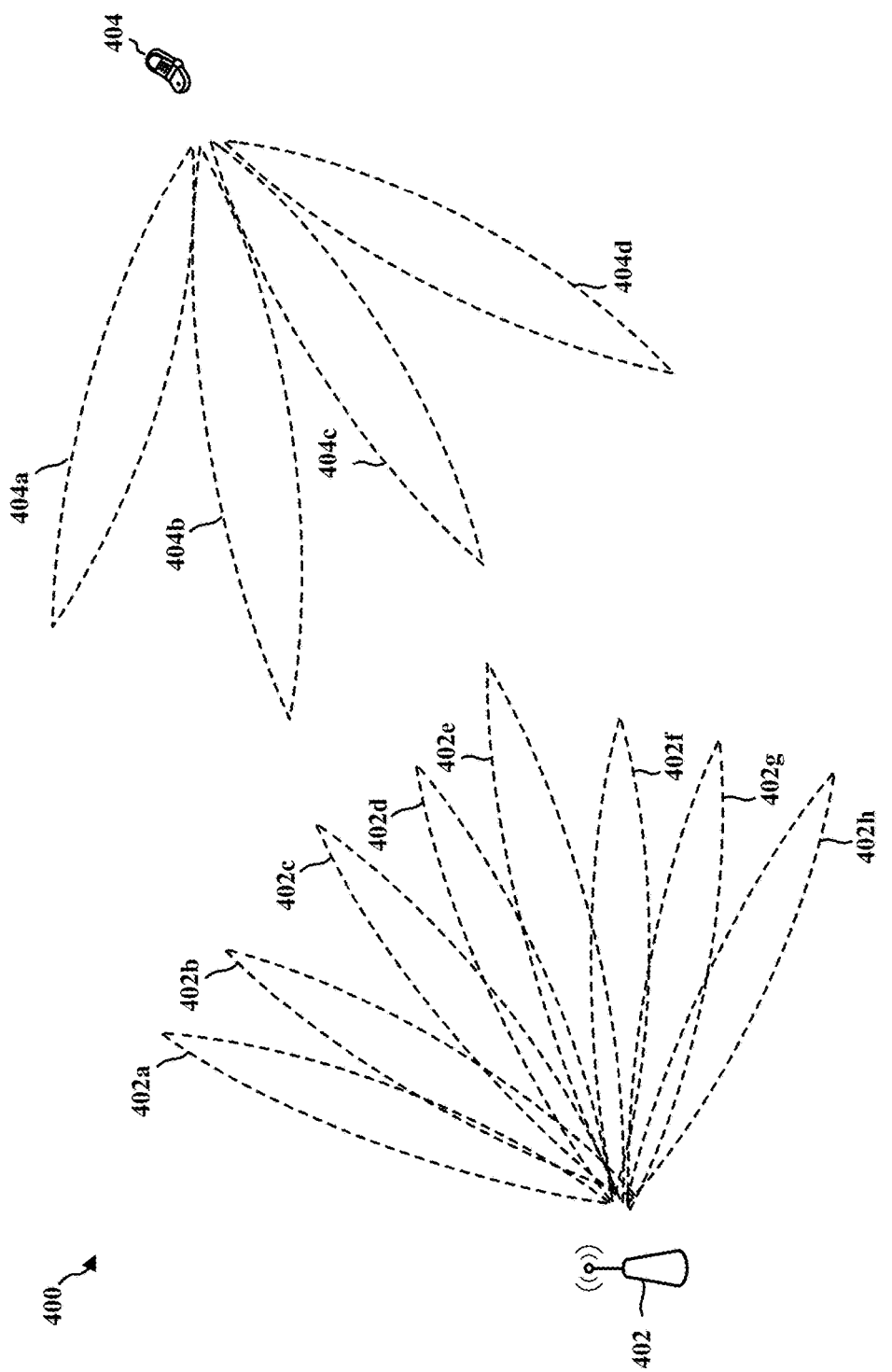
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Wireless communication systems employing narrow bandwidths and high frequency carriers are being developed and deployed. An MMW system may be utilized for wireless communication at a high transmission rate. In MMW systems, because the carrier frequency is high (e.g., 28 GHz), path loss may be high. For example, the carrier frequency for MMW communication may be 10 times higher than a carrier frequency for other types of wireless communication. As a result, the MMW system may experience a path loss that is approximately 20 dB higher than other types of wireless communication systems employing lower frequency carriers. To mitigate the path loss in MMW systems, a base station may perform transmissions in a directional manner, where the transmissions are beam-formed to steer the transmissions of the beams in different directions.

Using a higher carrier frequency for wireless communication results in a shorter wavelength which may allow a higher number of antennas to be implemented within a given antenna array length than a number of antennas that can be implemented when a lower carrier frequency is used. Therefore, an MMW system (using a high carrier frequency) may use a higher number of antennas in a base station and/or a UE. For example, the base station may have 128 or 256 antennas and the UE may have 8, 16 or 24 antennas. With the higher number of antennas, a beam-forming technique may be used to digitally change the direction of the beam by applying different phases to the different antennas. Because beam-forming in an MMW system provides a narrow beam for increased gain, the base station may transmit the narrow beam in all directions when transmitting a synchronization signal to provide coverage over a wider area using multiple narrow beams.

One challenge in using beam-forming for a MMW system arises from the directional nature of a beam-formed beam. The directional nature of the beam means that a transmitting entity should point a beam of the transmitting entity directly at a receiving entity to provide more antenna receive gain at the receiving entity. For example, the base station should point the beam directly at the UE such that the direction of the beam of the base station aligns with the location of the UE to provide more antenna receive gain at the UE. If the direction of the beam is not aligned properly, the antenna gain at the UE may be decreased (e.g., resulting in low SNR, high block error rates, etc.). Further, when the UE enters the coverage area of the MMW system and receives transmitted data from the base station over the MMW, the base station should be able to determine the best beam(s) (e.g., beam(s) with the highest signal strength) for MMW communication with the particular UE. Thus, the base station may transmit beam reference signals (BRSs) in multiple directions (or all directions) so that the UE may identify the best beam of the one or more beams received from the base station based on measurements of the BRSs. In the MMW communication, the base station may also transmit a primary synchronization signal (PSS), a secondary synchronization signal (SSS), an extended synchronization signal (ESS), and PBCH signals for synchronization and for broadcasting system information. In the MMW communication, such signals may be transmitted directionally via multiple beams to enable the UE to receive such synchronization and system information at various locations within the coverage area of the base station.

If there are multiple antenna ports (multiple sets of antennas) in the base station, the base station may transmit multiple beams per symbol. For example, the base station may sweep in multiple directions using multiple antenna ports in a cell specific manner in a first symbol of a synchronization sub-frame. The base station may then sweep in multiple directions using the multiple antenna ports in a cell specific manner in another symbol of the synchronization sub-frame. Each antenna port may include a set of antennas. For example, an antenna port including a set of antennas (e.g., 64 antennas) may transmit one beam, and several antenna ports may each transmit a beam, each in a different direction. Thus, if there are four antenna ports, the four antenna ports may sweep through four directions (e.g., transmit four beams in four different directions).

Figure 5A:
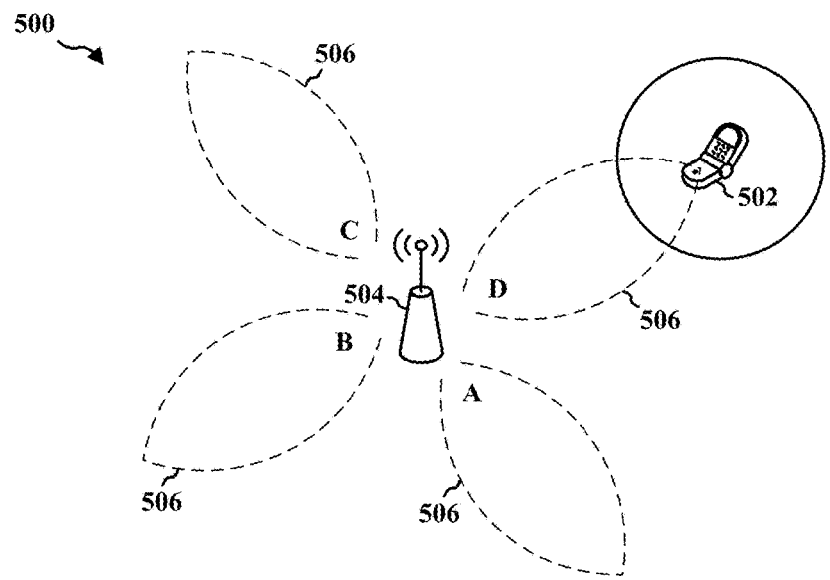
FIGS. 5A and 5B are diagrams illustrating an example of the transmission of beamformed signals between a base station and a UE.
Figure 5B:
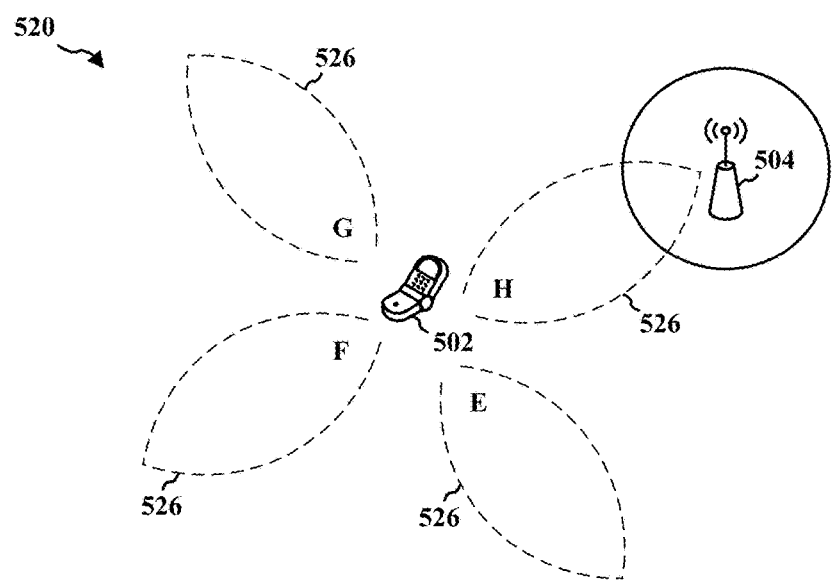

FIGS. 5A and 5B are diagrams illustrating an example of the transmission of beamformed signals between a base station (BS) and a UE. The BS may be embodied as a BS in a MMW system (MMW BS). Referring to FIG. 5A, diagram 500 illustrates a BS 504 of a MMW system transmitting beamformed signals 506 (e.g., beam reference signals) in different transmit directions (e.g., directions A, B, C, and D). In an example, the BS 504 may sweep through the transmit directions according to a sequence A-B-C-D. In another example, the BS 504 may sweep through the transmit directions according to the sequence B-D-A-C. Although only four transmit directions and two transmit sequences are described with respect to FIG. 5A, any number of different transmit directions and transmit sequences are contemplated.

The BS 504 may switch to a receive mode (e.g., after transmitting the signals). In the receive mode, the BS 504 may sweep through different receive directions in a sequence or pattern corresponding (or mapping) to a sequence or pattern in which the BS 504 previously transmitted the synchronization/discovery signals in the different transmit directions. For example, if the BS 504 previously transmitted the synchronization/discovery signals in transmit directions according to the sequence A-B-C-D, then the BS 504 may sweep through receive directions according to the sequence A-B-C-D in an attempt to receive an association signal from a UE 502. In another example, if the BS 504 previously transmitted the synchronization/discovery signals in transmit directions according to the sequence B-D-A-C, then the BS 504 may sweep through receive directions according to the sequence B-D-A-C in an attempt to receive the association signal from the UE 502.

A propagation delay on each beamformed signal allows a UE 502 to perform a receive (RX) sweep. The UE 502 in a receive mode may sweep through different receive directions in an attempt to detect a synchronization/discovery signal 506 (see FIG. 5B). One or more of the synchronization/discovery signals 506 may be detected by the UE 502. When a strong synchronization/discovery signal 506 is detected, the UE 502 may determine an optimal transmit direction of the BS 504 and an optimal receive direction of the UE 502 corresponding to the strong synchronization/discovery signal. For example, the UE 502 may determine preliminary antenna weights/directions of the strong synchronization/discovery signal 506, and may further determine a time and/or resource where the BS 504 is expected to optimally receive a beamformed signal (e.g., with high signal strength). Thereafter, the UE 502 may attempt to associate with the BS 504 via a beamformed signal.

The BS 504 may sweep through a plurality of directions using a plurality of ports in a cell-specific manner in a first symbol of a synchronization subframe. For example, the BS 504 may sweep through different transmit directions (e.g., directions A, B, C, and D) using four ports in a cell-specific manner in a first symbol of a synchronization subframe. In an aspect, these different transmit directions (e.g., directions A, B, C, and D) may be considered "coarse" beam directions. In an aspect, a beam reference signal (BRS) may be transmitted in different transmit directions (e.g., directions A, B, C, and D).

In an aspect, the BS 504 may sweep the four different transmit directions (e.g., directions A, B, C, and D) in a cell-specific manner using four ports in a second symbol of a synchronization subframe. A synchronization beam may occur in a second symbol of the synchronization subframe.

Referring to diagram 520 of FIG. 5B, the UE 502 may listen for beamformed discovery signals in different receive directions (e.g., directions E, F, G, and H). In an example, the UE 502 may sweep through the receive directions according to a sequence E-F-G-H. In another example, the UE 502 may sweep through the receive directions according to the sequence F-H-E-J. Although only four receive directions and two receive sequences are described with respect to FIG. 5B, any number of different receive directions and receive sequences are contemplated.

The UE 502 may attempt the association with the BS 504 by transmitting beamformed signals 526 (e.g., association signals or another indication of a best "coarse" beam or a best "fine" beam) in the different transmit directions (e.g., directions E, F, G, and H). In an aspect, the UE 502 may transmit an association signal 526 by transmitting along the optimal receive direction of the UE 502 at the time/resource where the BS 504 is expected to optimally receive the association signal. The BS 504 in the receive mode may sweep through different receive directions and detect the association signal 526 from the UE 502 during one or more timeslots corresponding to a receive direction. When a strong association signal 526 is detected, the BS 504 may determine an optimal transmit direction of the UE 502 and an optimal receive direction of the BS 504 corresponding to the strong association signal. For example, the BS 504 may determine preliminary antenna weights/directions of the strong association signal 526, and may further determine a time and/or resource where the UE 502 is expected to optimally receive a beamformed signal. Any of the processes discussed above with respect to FIGS. 5A and 5B may be refined or repeated over time such that the UE 502 and BS 504 eventually learn the most optimal transmit and receive directions for establishing a link with each other. Such refinement and repetition may be referred to as beam training.

In an aspect, the BS 504 may choose a sequence or pattern for transmitting the synchronization/discovery signals according to a number of beamforming directions. The BS 504 may then transmit the signals for an amount of time long enough for the UE 502 to sweep through a number of beamforming directions in an attempt to detect a synchronization/discovery signal. For example, a BS beamforming direction may be denoted by n, where n is an integer from 0 to N, N being a maximum number of transmit directions. Moreover, a UE beamforming direction may be denoted by k, where k is an integer from 0 to K, K being a maximum number of receive directions. When the UE 502 detects a synchronization/discovery signal from the BS 504, the UE 502 may discover that the strongest synchronization/discovery signal is received when the UE 502 beamforming direction is k=2 and the BS 504 beamforming direction is n=3. Accordingly, the UE 502 may use the same antenna weights/directions for responding (transmitting a beamformed signal) to the BS 504 in a corresponding response timeslot. That is, the UE 502 may send a signal to the BS 504 using UE 502 beamforming direction k=2 during a timeslot when the BS 504 is expected to perform a receive sweep at BS 504 beamforming direction n=3.

Path loss may be relatively high in MMW systems. Transmission may be directional to mitigate path loss. A base station may transmit one or more beam reference signals by sweeping in all directions so that a user equipment (UE) may identify a best "coarse" beam. Further, the base station may transmit a beam refinement request signal so that the UE may track "fine" beams. If a "coarse" beam identified by the UE changes, the UE may need to inform the base station so that the base station may perform beam training for one or more new "fine" beams for the UE.

In various aspects, a base station may transmit a beam reference signal (BRS) by sweeping in all directions that so a user equipment (UE) may determine the index or identifier (ID) of a best "coarse" beam. The base station may further transmit a beam refinement request signal so that the UE may track "fine" beams. The UE may signal a best "fine" beam to the base station. The base station and the UE may have to continuously update and/or recover beams to sustain a communication link.

In FIG. 5A and FIG. 5B, the base station 504 and the UE 502 may sweep through four directions using four ports in a cell-specific manner in the first symbol of the synchronization subframe. These directions may be considered "coarse" beam directions. In an aspect, a BRS may be included in a first symbol. In an aspect, the base station 504 and the UE 502 may sweep through four different directions in a cell-specific manner using four ports in the second symbol of the synchronization subframe. Note that while beams are shown adjacent, beams transmitted during a same symbol may not be adjacent.

FIGS. 6A through 6D are diagrams illustrating an example of the transmission of beamformed signals between a base station (BS) and a UE. The BS 604 may be a BS in a MMW system (MMW BS). While some beams are illustrates as adjacent to one another, such an arrangement may be different in different aspects (e.g., beams transmitted during a same symbol may not be adjacent to one another).

In an aspect, a beam set may contain eight different beams. For example, FIG. 6A illustrates eight beams 621, 622, 623, 624, 625, 626, 627, 628 for eight directions. In aspects, the BS 604 may be configured to beamform at least one of the beams 621, 622, 623, 624, 625, 626, 627, 628 for transmission toward the UE 602.

In an aspect, a BS may transmit a first tracking signal (e.g., a BRS) in a plurality of directions during a synchronization subframe. In one aspect, the transmission of the first tracking signal may be cell-specific. Referring to FIG. 6B, the BS 604 may transmit beams 621, 623, 625, 627 in four directions. In an aspect, the beams 621, 623, 625, 627 transmitted in the four directions may be odd-indexed beams 621, 623, 625, 627 for the four directions out of a possible eight directions for the beam set. For example, the BS 604 may be capable of transmitting beams 621, 623, 625, 627 in directions adjacent to other beams 622, 624, 626, 628 that the BS 604 is configured to transmit. In an aspect, the configuration in which the BS 604 transmits odd-indexed beams 621, 623, 625, 627 for the four directions may be considered a "coarse" beam set.

In FIG. 6C, the UE 602 may determine a beam index that is strongest or preferable (e.g., a beam index indicating the best beam). For example, the UE 602 may determine that the beam 625 carrying a BRS is the strongest beam or preferable (e.g., with a highest signal strength). The UE 602 may transmit an indication 660 of the beam index of beam 625 to the BS 604. In an aspect, the indication 660 may include a request to transmit a second tracking signal (e.g., a beam refinement reference signal (BRRS)). The BRRS may be UE-specific.

In FIG. 6D, the BS 604 may transmit a second tracking signal (e.g., a BRRS) based on the beam index included in the indication 660. For example, the UE 602 may indicate that a first beam 625 is the strongest beam (or preferable beam) and, in response, the BS 604 may transmit a plurality of beams 624, 625, 626 to the UE 602 based on the indicated beam index received from the UE. In an aspect, the beams 624, 625, 626 transmitted based on the indicated beam index may be considered a "fine" beam set. In an aspect, a BRRS may be transmitted on each of the beams 624, 625, 626 of the fine beam set. In an aspect, the beams 624, 625, 626 of the fine beam set may be adjacent.

Based on one or more BRRSs received in the beams 624, 625, 626 of the fine beam set, the UE 602 may transmit a second indication 665 to the BS 604 to indicate a best "fine" beam. In an aspect, the second indication 665 may use 2 bits to indicate the selected beam. For example, the 2 bits may be used to express a binary number, where each of the beams correspond to a particular binary number. For example, the UE 602 may transmit an indication 665 that indicates the selected beam 625. The BS 604 may then communicate with the UE 602 using the active beam 625.

As discussed above, the UE may select the best beam (e.g., the beam that provides the highest signal strength) of the base station, and may transmit an indication of the selected beam to the base station, such that the base station may communicate with the UE using the selected beam. After selection of the beam to transmit a signal from the base station to the UE (the active beam), the best beam (e.g., the beam that provides the highest signal strength) from a base station to a UE may change over time. For example, due to changes in network conditions, after some time has passed, the selected beam may no longer be the best beam for communicating with the UE. Thus, the base station may transmit a BRS in multiple directions (or all directions) periodically. In an aspect, based on the reception of the BRS, if the UE determines that another beam in a certain direction used to transmit the BRS is better than the current beam (e.g., providing a higher signal strength than the current beam), then the UE may determine that the base station should change the beam from the current beam to another beam. To change to another beam, the UE may utilize the beam selection process, as discussed above, involving beam refinement based on a "coarse" beam set. When the UE determines that the base station should change from a current beam to a second beam, the UE may transmit, to the base station, an indication about the determination that the base station should change from the current beam to the second beam. In response, the base station may determine whether to change to the second beam (e.g., based on network conditions). In an aspect, when the UE informs the base station about the beam change request, the base station may determine not to change the current beam to the second beam if the second beam interferes with a neighboring base station.

In another aspect, the base station may determine whether to change from the current beam to another beam, without receiving an indication of UE's determination that the base station should change from the current beam to another beam. In particular, if the base station has beam reciprocity, the base station may observe a reference signal or utilize another type of uplink beam sweep procedure and decide whether the base station should change from the current beam to another beam to communicate with the UE.

If the base station determines that the change from the current beam to the second beam is appropriate (e.g., does not interfere with a neighboring base station), the base station may send a beam change instruction to the UE (e.g., via PDCCH) to indicate that the base station will change from the current beam to the second beam. In an aspect, a portion (e.g., certain bits) of DCI included in the PDCCH may be used to convey the beam change instruction to indicate whether the base station will change from the current beam to the second beam. If the UE receives the beam change instruction indicating that the base station will change from the current beam to the second beam, the UE may change to a corresponding UE beam at the UE in response to the beam change instruction.

Figure 7:
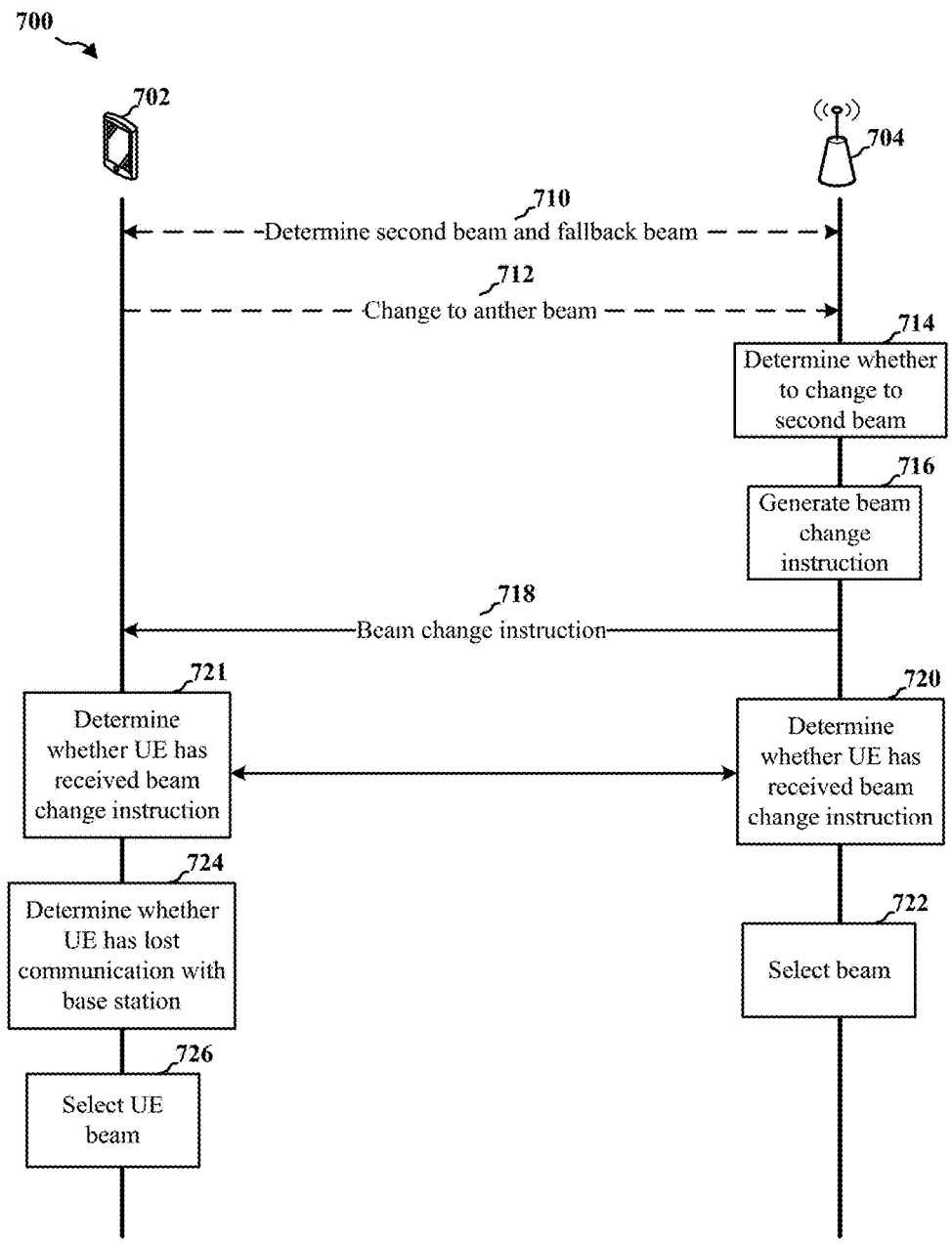
FIG. 7 is an example diagram illustrating communication between a user equipment and a base station to select a beam.

The base station may confirm that the UE received the beam change instruction. In one aspect, if the base station cannot confirm that the UE received the beam change instruction, the base station may not change the current beam to the second beam. According to an aspect of the disclosure, if the base station does not determine that the UE received the beam change instruction, the base station may select a fallback beam that the base station may use to communicate with the UE. The fallback beam may be a receive beam and/or a transmit beam at the base station. In an aspect, the UE may select a corresponding UE beam that the UE may use to communicate with the base station that uses the fallback beam. The corresponding UE beam at the UE may be a receive beam and/or a transmit beam at the UE. In an aspect, the base station may indicate to the UE that the base station has selected the fallback beam FIG. 7 is an example diagram 700 illustrating an interaction between a user equipment (e.g., UE 702) and a base station (e.g., base station 704), according to an aspect of the disclosure. Before 710, the base station 704 may communicate with the UE 702 using a current beam of the base station 704 (e.g., a beam selected to communicate with the UE). The current beam may be a current receive beam and/or a current transmit beam at the base station. The UE 702 may utilize a first UE beam to communicate with the base station 704 utilizing the current beam. At 710, the base station 704 and/or the UE 702 may determine that a second beam is the best beam the base station may utilize instead of the current beam, and may further determine a fallback beam that the base station 704 may use to communicate with the UE 702. Thus, in an aspect, the fallback beam may be a predefined beam. At 712, the UE 702 informs the base station 712 that the base station should change from the current beam to the second beam (e.g., by sending a beam change request to change from the current beam to the second beam). The second beam may be a second receive beam and/or a second transmit beam at the base station. At 714, in response, the base station 704 determines whether to change from the current beam to the second beam. At 716, if the base station 704 determines to change to the second beam, the base station 704 generates a beam change instruction to indicate that the base station 704 will change the beam to the second beam. At 718, the base station 704 sends the beam change instruction to the UE 702.

At 720, the base station 704 determines whether the UE received the beam change instruction. For example, the base station 704 may determine that the UE received the beam change instruction if the UE sends an ACK in response to the beam change instruction. At 721, the UE 702 may determine whether the UE received the beam change instruction. In an aspect, if the UE 702 has successfully received the beam change instruction, the UE 702 may switch to a second UE beam, especially if the second UE beam is more aligned with the second beam of the base station 704 than the first UE beam. At 722, if the base station 704 determines that the UE received the beam change instruction, the base station 704 switches to the second beam. At 722, if the base station 704 does not determine that the UE received the beam change instruction (e.g., because the base station received no ACK was received either due to the UE not receiving the instruction or the ACK being lost or because the base station received a NACK), the base station 704 may switch to the fallback beam.

In an aspect, at 724, the UE 702 may determine whether UE 702 has lost communication with the base station 704 (e.g., after the base station sends the beam change instruction at 718). In one aspect, the UE 702 may determine that the UE 702 has lost communication with the base station 704 if the UE 702 fails to communicate with the base station using the second UE beam after receiving the beam change instruction. In one aspect, the UE 702 may determine that the UE 702 has lost communication with the base station 704 if the UE 702 fails to successfully receive the beam change instruction (and fails to communicate with the base 704 using the first UE beam). In one aspect, the UE 702 may determine that the UE 702 has lost communication with the base station 704 if the UE 702 does not determine that the base station 704 has received an ACK of successful reception of the beam change instruction after the UE 702 transmits the ACK to the base station 704. If the UE 702 determines at 724 that the UE 702 lost communication with the base station 704, the UE 702 may determine that the base station is not configured with the second beam. At 726, the UE 702 may select a UE beam to communicate with the base station 704. In an aspect, at 726, upon determining that the base station is not configured with the second beam of the base station, the UE 702 may select a third UE beam to communicate with the base station 704 utilizing the fallback beam. In one aspect, the third UE beam may be the first UE beam.

At least one of several approaches may be utilized for the base station to determine whether or not the UE received the beam change instruction. According to one approach, the base station may determine that the UE did not receive the beam change instruction if the base station receives a NACK from the UE in response to the beam change instruction. Therefore, when the base station receives a NACK from the UE in response to the beam change instruction, the base station selects a fallback beam to communicate with the UE. The base station may switch to the fallback beam when a certain time duration (e.g., t1 time) expires after receiving the NACK from the UE in response to the beam change instruction. The t1 time may be equal to a duration equivalent to approximately 10 slots (5 msec). For example, the base station may send the beam change instruction in DCI for a downlink grant or DCI for an uplink grant, and the UE may respond by transmitting an ACK (to indicate that the UE received the beam change instruction) or a NACK (to indicate that the UE did not receive the beam change instruction). When the base station receives an ACK, the base station may confirm that the UE received the beam change instruction. Bits may be reserved in the PDCCH for DCI for a downlink grant and/or DCI for an uplink grant. A downlink transmission and/or an uplink transmission may take place at the (n+k)th subframe and a beam change may occur at the (n+k')th subframe, where k'>k. That is, the UE may receive the beam change instruction included in at least one of DCI for a downlink grant or DCI for an uplink grant at the n-th subframe, and then transmit an ACK if the UE received the beam change instruction at the (n+k)th subframe, such that the base station may change the beam at the (n+k')th subframe, where k' is greater than k.

According to another approach, the base station may determine that the UE has not received the beam change instruction if there is a state disconnect between the base station and the UE. The state disconnect between the base station and the UE may exist when the base station does not receive a response (e.g., an ACK or a NACK) from the UE (e.g., in response to the beam change instruction or any other message sent from the base station that solicits a response). For example, due to the state disconnect between the base station and the UE, the base station may not be able to receive a response (e.g., ACK) from the UE regardless of whether the UE sends the response. As such, when in the state disconnect, the base station and the UE may not be able to communicate with each other. Therefore, when there is state disconnect between the base station and the UE, the base station may determine that the UE did not receive the beam change instruction and thus selects a fallback beam to communicate with the UE. The base station may switch to the fallback beam when a certain time duration (e.g., t1 time) expires after determining the state disconnect between the base station and the UE.

According to another approach, the base station may determine that the UE did not receive the beam change instruction if the base station and the UE are unable to communicate using the second beam indicated by the beam change instruction for a certain time duration (e.g., t2 time) after sending the beam change instruction. For example, even if the base station receives an ACK from the UE in response to the beam change instruction, when the base station switches to a new beam indicated in the beam change instruction, the base station and the UE may not be able to communicate with each other using the new beam (e.g., due to errors caused by movement of the UE). In an aspect, the t2 time may be greater than the t1 time.

In an aspect, when communication using the fallback beam fails for the base station and/or the UE, the UE and/or the base station may initiate a beam recovery procedure. The beam recovery procedure may be based on a random access channel (RACH) signal and/or a beam recovery request. For example, after the base station switches to the fallback beam, if the base station does not receive a NACK or an ACK or does not receive any response or communication from the UE for a certain time duration (e.g., t3 time), the base station may assume that the fallback beam is not working. The base station may signal the UE to inform that the fallback beam is not working. According to one approach of the beam recovery procedure, the UE may transmit a RACH signal to the base station to indicate a recovery beam to the base station, such that the base station may select the recovery beam for communication with the UE. In an aspect, the UE may transmit a RACH signal to the base station if the UE is not time-synchronized with the base station. The RACH signal may be transmitted via a contention-based mechanism and/or a contention-free mechanism, where the contention-based mechanism may use contention-based preambles to transmit the RACH signal and the contention-free mechanism may use contention-free preambles to transmit the RACH signal. In an aspect, the resource selection for the RACH signal may be based on a resource of a downlink synchronization signal block. In such an aspect, the base station may use a beam associated with the selected resource of the downlink synchronization signal block, as a recovery beam to communicate with the UE. For example, the base station may transmit a downlink synchronization signal to the UE in a particular direction according to the beam associated with a resource of the downlink synchronization signal block, and may receive a RACH signal in response in the particular direction to indicate a recovery beam to the base station. The UE's transmission time of the RACH signal may be based on the downlink synchronization signal. Thus, when the UE is transmitting a RACH signal, the UE may select a resource for the RACH signal based on the resource of the downlink synchronization signal.

According to another approach of the beam recovery procedure, the UE may transmit a beam recovery request to the base station to indicate a recovery beam to the base station, such that the base station may select the recovery beam for communication with the UE. In an aspect, the UE may transmit the beam recovery request to the base station if the UE is not time-synchronized with the base station. In an aspect, the beam recovery request may be transmitted through a RACH subframe. For example, in a RACH subframe, a total amount of resources (e.g., specified in frequency bands or time/frequency blocks) may be split into two parts, where the first part is used to transmit RACH signals, and the second part is used to transmit a beam recovery request (e.g., via a scheduling request (SR)). In an aspect, the resource selection for the beam recovery request may be based on a resource of a downlink synchronization signal block. In such an aspect, the base station may use a beam associated with the selected resource of the downlink synchronization signal block, as a recovery beam to communicate with the UE.

The following approaches may be used to set a fallback beam for the base station. In an aspect, the base station and the UE may define a fallback beam among multiple candidate fallback beams. For example, the base station may have several candidate fallback beams the base station may use for transmission to the UE, and the UE may have several candidate UE beams the UE may use for reception from the base station. The UE may make measurements of signal quality for each beam pair including one of the candidate fallback beams of the base station and one of the candidate UE beams of the UE. For example, the UE may make the measurements of the signal quality based on the signal quality of communication from the base station to the UE (e.g., based on signal quality of communication of a reference signal from the base station using the candidate fallback beams) and/or the signal quality of communication from the UE to the base station, using each beam pair (e.g., based on signal quality of communication of a reference signal to the base station using the candidate fallback beams). For example, if there are three candidate fallback beams (fallback beams 1, 2, and 3) and two candidate UE beams (UE beam 1 and 2, then there are six possible beam pairs (e.g., candidate fallback beam 1 and candidate UE beam 1, candidate fallback beam 2 and candidate UE beam 1, candidate fallback beam 3 and candidate UE beam 1, candidate fallback beam 1 and candidate UE beam 2, candidate fallback beam 2 and candidate UE beam 2, candidate fallback beam 3 and candidate UE beam 2). The measurement of the signal quality may be based on a signal-to-noise ratio, a received signal receive power (RSRP) value, etc. Based on the measurement of each beam pair, the UE selects the best candidate fallback beam of the base station as a fallback beam that the base station may use to communicate with the UE and the best candidate UE beam of the UE as a UE beam to communicate with the base station using the fallback beam. When the UE selects the fallback beam of the base station, the UE indicates to the base station the fallback beam of the base station (e.g., by transmitting a beam identifier of the fallback beam). In an aspect, the UE and the base station may determine the fallback beam of the base station before generating the beam change instruction.

In another aspect, a UE may measure the quality of candidate beams (e.g., reference beams) used by the base station to transmit reference signal(s) to the UE, where the quality of the each candidate beam is measured based on the reference signal(s), and may subsequently send a measurement report of the measurements of the quality of candidate beams to the base station, such that the base station may select a fallback beam out of the multiple candidate beams based on the measurement report. For example, the base station may send reference signals using multiple candidate beams in different directions. Thus, for each candidate beam with a corresponding direction, a base station may periodically send reference signals, and the UE may measure the quality of the reference signals and periodically feedback a measurement report of the quality of the reference signals for each beam to the base station. Then, the base station may select a beam out of the multiple candidate beams receivable by the UE to communicate with the UE based on the measurement report. The measurement report of the quality of the reference signals may include information on at least one of a beam identifier for each candidate beam, a signal to noise ratio (SNR) for each candidate beam, a signal-to-interference-plus-noise ratio (SINR) for each candidate beam, a received signal receive power (RSRP) for each candidate beam, a received signal receive quality (RSRQ), a received signal strength indicator (RSSI) for each candidate beam, or a channel quality indicator (CQI) for each candidate beam. In an aspect, the reference signal may include one or more of an SSS, a BRS, a mobility reference signal, a channel status information reference signal (CSI-RS), and a demodulation reference signal (DMRS) for a PBCH signal. In an aspect, the base station may specify (e.g., to the UE) a UE beam pattern for each of the candidate beams when the UE measures the reference signal. In particular, the base station may request the UE to try different UE beams (e.g., based on the UE beam pattern) when the base station is transmitting the reference signal, such that the UE may find a UE beam that provides the best signal quality (e.g., a UE beam with the highest signal strength) when used with a fallback beam of the base station. In an aspect, the fallback beam may be a wide beam at the base station and/or may be a pseudo-omni beam (e.g., a beam with an angular range of 120 degrees) at the UE. In an aspect, the fallback beam may be the current working beam (e.g., the current beam before beam switching).

In an aspect, the fallback beam may be set before the beam change instruction is transmitted. The fallback beam may be updated (e.g., re-defined) by the base station and/or by the UE) over time. For example, the fallback beam may be periodically updated (e.g., using the approaches to set the fallback beam as discussed above).

In an aspect, parameters for communication using the fallback beam may have different values from the parameters for communication using other beams (e.g., current beam, the second beam). For example, the fallback beam may be more resistant to device mobility (e.g., UE mobility) than the first beam or the second beam. Hence, the fallback beam may have a broader beam width than other beams (e.g., thus covering a wider angular region) and may have lower coverage in terms of distance (e.g., covering a less geographical distance). In an aspect, the parameters for communication using the fallback beam may include at least one of a uplink power control offset, or aggregation level on a downlink control channel. In one example, a fallback beam may have a larger uplink power control offset. Because downlink communication using a fallback beam may have lower linking, a corresponding uplink power control offset of the fallback beam may be higher than an uplink power control offset of other beams. In uplink communication using the fallback beam, the uplink transmit power may be higher but the beam width may be broader, and thus the linking remains unchanged. In one example, the aggregation level on a downlink control channel (e.g., PDCCH) for the fallback beam may be higher than the aggregation level on a downlink control channel (e.g., PDCCH) for other beams. In an aspect, the parameters for communication using the fallback beam may be configured by RRC signaling and/or by a downlink control channel (e.g., PDCCH) and/or may be reconfigured if the fallback beam changes to another fallback beam or properties of the fallback beam change.

Figure 8:
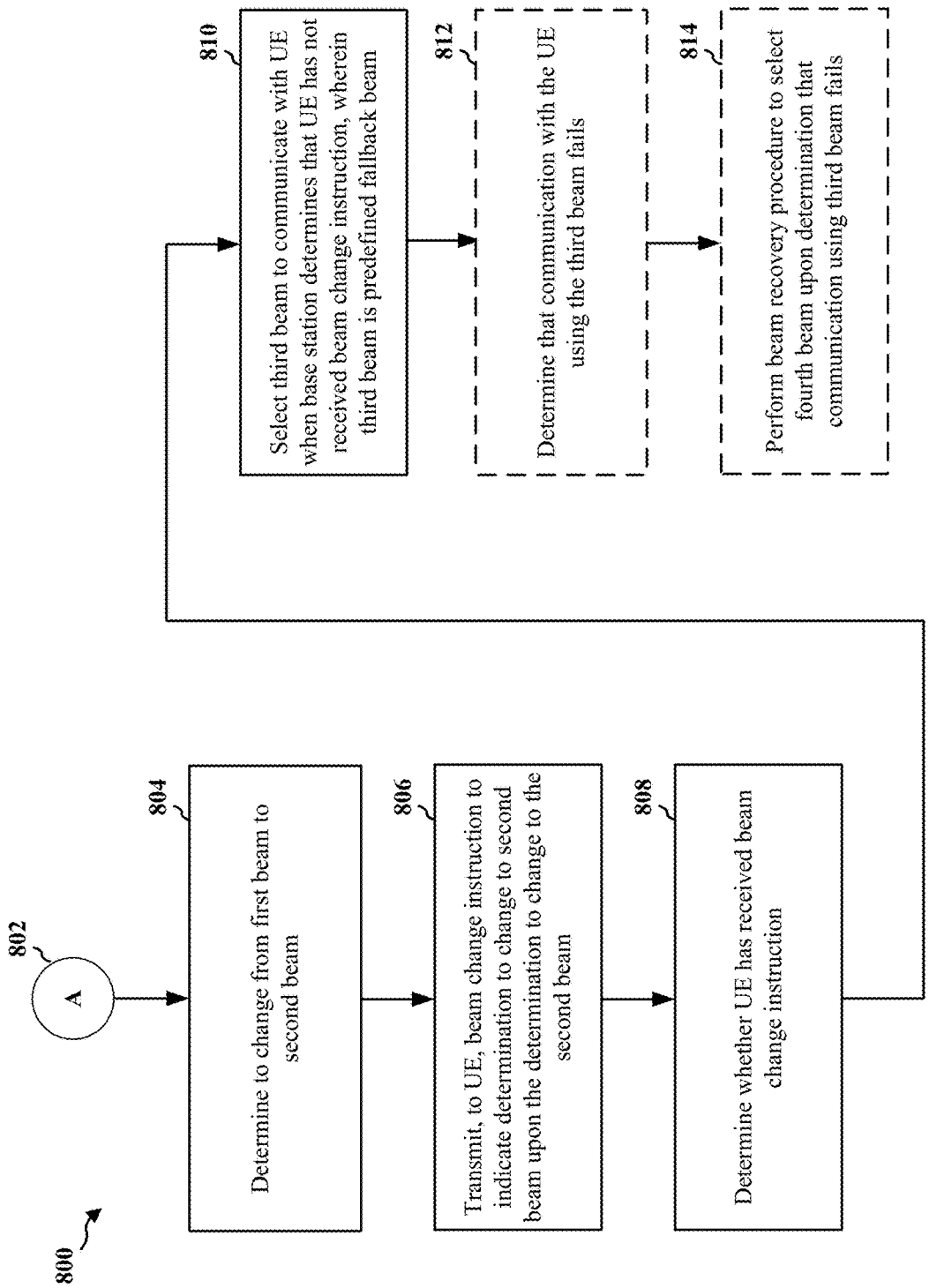
FIG. 8 is a flowchart of a method of wireless communication.

FIG. 8 is a flowchart 800 of a method of wireless communication. The method may be performed by a base station (e.g., the base station 102, the base station 704, the apparatus 1002/1002'). At 802, the base station may continue from performing additional features, as discussed infra. At 804, the base station determines to change from a first beam to a second beam. At 806, the base station transmits, to a UE, a beam change instruction to indicate the determination to change to the second beam upon the determination to change to the second beam. For example, as illustrated in FIG. 7, at 714, the base station 704 determines whether to change from the current beam to the second beam. For example, as illustrated in FIG. 7, at 716, if the base station 704 determines to change to the second beam, the base station 704 generates a beam change instruction to indicate that the base station 704 will change the beam to the second beam, and at 718, the base station 704 sends the beam change instruction to the UE 702.

At 808, the base station determines whether the UE has received the beam change instruction. For example, as illustrated in FIG. 7, at 720, the base station 704 determines whether the UE received the beam change instruction. At 810, the base station selects a third beam to communicate with the UE when the base station determines that the UE has not received the beam change instruction, where the third beam is a predefined fallback beam. For example, as illustrated in FIG. 7, at 722, if the base station 704 does not determine that the UE received the beam change instruction (e.g., because the base station received no ACK was received either due to the UE not receiving the instruction or the ACK being lost or because the base station received a NACK), the base station 704 may switch to the fallback beam.

In an aspect, the base station may determine whether the UE has received the beam change instruction by: determining whether a NACK is received from the UE in response to the beam change instruction, and determining that the UE has not received the beam change instruction if the NACK is received. In such an aspect, the third beam is selected when a first duration expires after receiving the NACK. For example, as discussed supra, the base station may determine that the UE did not receive the beam change instruction if the base station receives a NACK from the UE in response to the beam change instruction. For example, as discussed supra, the base station may switch to the fallback beam when a certain time duration (e.g., t1 time) expires after receiving the NACK from the UE in response to the beam change instruction.

In another aspect, the base station may determine whether the UE has received the beam change instruction by: determining whether the UE and the base station are in a state disconnect, and determining that the UE has not received the beam change instruction if the UE and the base station are in the state disconnect. In such an aspect, the third beam may be selected when a first duration expires after determining that the UE and the base station are in the state disconnect. In such an aspect, the UE and the base station may be in the state disconnect if the base station has not received an acknowledgement from the UE in response to the beam change instruction regardless of whether the UE has sent the acknowledgement or not. For example, as discussed supra, the base station may determine that the UE has not received the beam change instruction if there is a state disconnect between the base station and the UE. For example, as discussed supra, the base station may switch to the fallback beam when a certain time duration (e.g., t1 time) expires after determining the state disconnect between the base station and the UE. For example, as discussed supra, the state disconnect between the base station and the UE may exist when the base station does not receive a response (e.g., an ACK or a NACK) from the UE (e.g., in response to the beam change instruction or any other message sent from the base station that solicits a response.

In another aspect, the base station may determine whether the UE has received the beam change instruction by: determining whether the base station and the UE are able to communicate with each other via the second beam at least for a second duration, and determining that the UE has not received the beam change instruction if the base station is not able to communicate with each other via the second beam at least for the second duration. For example, as discussed supra, the base station may determine that the UE did not receive the beam change instruction if the base station and the UE are unable to communicate using the second beam indicated by the beam change instruction for a certain time duration (e.g., t2 time) after sending the beam change instruction.

In an aspect, the first beam may be at least one of a first transmit beam or a first receive beam, the second beam may be at least one of a second transmit beam or a second receive beam, and the fallback beam may be at least one of a fallback transmit beam or a fallback receive beam. For example, as discussed supra, the current beam may be a current receive beam and/or a current transmit beam at the base station, the second beam may be a second receive beam and/or a second transmit beam at the base station, and the fallback beam may be a receive beam and/or a transmit beam at the base station.

In an aspect, a parameter value for a parameter of the third beam may be different from a parameter value for the parameter of at least one of the first beam or the second beam. For example, as discussed supra, parameters for communication using the fallback beam may have different values from the parameters for communication using other beams (e.g., current beam, the second beam). In an aspect, the parameters of the third beam may include at least one of a uplink power control offset, or aggregation level on a downlink control channel. In such an aspect, the parameter of the third beam may reflect at least one of the following: an uplink power control offset of the third beam being larger than an uplink power control offset of the second beam, or an aggregation level on a control channel for the third beam being higher than an aggregation level on a downlink control channel for the second beam. For example, as discussed supra, the parameters for communication using the fallback beam may include at least one of a uplink power control offset, or aggregation level on a downlink control channel. For example, as discussed supra, a fallback beam may have a larger uplink power control offset. For example, as discussed supra, the aggregation level on a downlink control channel (e.g., PDCCH) for the fallback beam may be higher than the aggregation level on a downlink control channel (e.g., PDCCH) for other beams. In an aspect, the parameter of the third beam may be configured via at least one of an RRC signaling or a downlink control channel. In an aspect, the parameter of the third beam may be updated as the fallback beam is updated with time. For example, as discussed supra, the parameters for communication using the fallback beam may be configured by RRC signaling and/or by a downlink control channel (e.g., PDCCH) and/or may be reconfigured if the fallback beam changes to another fallback beam or properties of the fallback beam change.

In an aspect, the third beam is at least one of: a beam with a wider beam width than a beam width of the second beam, or a pseudo-omnidirectional beam at the UE. For example, as discussed supra, the fallback beam may be a wide beam at the base station and/or may be a pseudo-omni beam (e.g., a beam with an angular range of 120 degrees) at the UE. In an aspect, the third beam is same as the first beam. For example, as discussed supra, the fallback beam may be the current working beam (e.g., the current beam before beam switching).

In one aspect, at 812, the base station may determine that communication with the UE using the third beam fails. In such an aspect, at 804, the base station may perform a beam recovery procedure to select a fourth beam upon the determination that the communication using the third beam fails. For example, as discussed supra, when communication using the fallback beam fails for the base station and/or the UE, the UE and/or the base station may initiate a beam recovery procedure. In an aspect, the beam recovery procedure may be based on at least one of a beam recovery request or a RACH. For example, as discussed supra, the beam recovery procedure may be based on a RACH signal and/or a beam recovery request.

In an aspect, the base station may perform the beam recovery procedure by: receiving, from the UE, a RACH signal that indicates the fourth beam, and selecting the fourth beam to communicate with the UE based on the RACH signal. For example, as discussed supra, according to one approach, the UE may transmit a RACH signal to the base station to indicate a recovery beam to the base station, such that the base station may select the recovery beam for communication with the UE. In an aspect, the RACH signal may be received if the UE is not time-synchronized with the base station. For example, as discussed supra, the UE may transmit a RACH signal to the base station if the UE is not time-synchronized with the base station. In an aspect, a resource for receiving the RACH signal may be selected based on a resource of a downlink synchronization signal block. For example, as discussed supra, the base station may use a beam associated with the selected resource of the downlink synchronization signal block, as a recovery beam to communicate with the UE.

In an aspect, the base station may perform the beam recovery procedure by: receiving, from the UE, a beam recovery request that indicates the fourth beam, and selecting the fourth beam to communicate with the UE based on the beam recovery request. For example, as discussed supra, according to another approach, the UE may transmit a beam recovery request to the base station to indicate a recovery beam to the base station, such that the base station may select the recovery beam for communication with the UE. In an aspect, the beam recovery request may be received if the UE is not time-synchronized with the base station. For example, as discussed supra, the UE may transmit the beam recovery request to the base station if the UE is not time-synchronized with the base station. In an aspect, the beam recovery request may be received in a RACH subframe. For example, as discussed supra, the beam recovery request may be transmitted through a RACH subframe. In an aspect, a resource for receiving the beam recovery request may be selected based on a resource of a downlink synchronization signal block. For example, as discussed supra, the resource selection for the beam recovery request may be based on a resource of a downlink synchronization signal block.

FIG. 9A is a flowchart 900 of a method of wireless communication, expanding from the flowchart 800 of FIG. 8. The method may be performed by a base station (e.g., the base station 102, the base station 704, the apparatus 1002/1002'). At 902, the base station transmits, to the UE, at least one reference signal using a plurality of candidate beams. At 904, the base station receives an indication of the third beam from the UE based on UE reception quality of the at least one reference signal for each of the plurality of candidate beams. For example, as discussed supra, the UE may make the measurements of the signal quality based on the signal quality of communication from the base station to the UE (e.g., based on signal quality of communication of a reference signal from the base station using the candidate fallback beams) and/or the signal quality of communication from the UE to the base station, using each beam pair (e.g., based on signal quality of communication of a reference signal to the base station using the candidate fallback beams). For example, as discussed supra, based on the measurement of each beam pair, the UE selects the best candidate fallback beam of the base station as a fallback beam that the base station may use to communicate with the UE. When the UE selects the fallback beam of the base station, the UE indicates to the base station the fallback beam of the base station (e.g., by transmitting a beam identifier of the fallback beam). At 802, the base station continues to perform features of the flowchart 800 of FIG. 8.

FIG. 9B is a flowchart 950 of a method of wireless communication, expanding from the flowchart 800 of FIG. 8. The method may be performed by a base station (e.g., the base station 102, the base station 704, the apparatus 1002/1002'). At 952, the base station transmits, to the UE, at least one reference signal using a plurality of candidate beams. At 954, the base station receives, from the UE, a signal quality report for at least one of the plurality of candidate beams based on the at least one reference signal. At 956, the base station select a beam among the plurality of candidate beams as the third beam based on the signal quality report. For example, as discussed supra, a UE may measure the quality of candidate beams (e.g., reference beams) used by the base station to transmit reference signal(s) to the UE, where the quality of the each candidate beam is measured based on the reference signal(s), and may subsequently send a measurement report of the measurements of the quality of candidate beams to the base station, such that the base station may select a fallback beam out of the multiple candidate beams based on the measurement report. In an aspect, the signal quality report comprises information on at least one of a beam identifier for each candidate beams, a SNR for each candidate beam, a SINR for each candidate beam, an RSRP for each candidate beam, an RSRQ, an RSSI for each candidate beam, or a CQI for each candidate beam. For example, as discussed supra, the measurement report of the quality of the reference signals may include information on at least one of a beam identifier for each candidate beam, an SNR for each candidate beam, an SINR for each candidate beam, an RSRP for each candidate beam, an RSRQ, an RSSI for each candidate beam, or a CQI for each candidate beam. In an aspect, the at least one reference signal includes at least one of an secondary synchronization signal, a beam reference signal, a mobility reference signal, a CSI-RS, and a demodulation reference signal for a physical broadcast channel signal. For example, as discussed supra, the reference signal may include one or more of an SSS, a BRS, a mobility reference signal, a CSI-RS, and a DMRS for a PBCH signal.

At 958, in an aspect, the base station may transmit, to the UE, a UE beam pattern for each of the candidate beams, where the signal quality report is further based on the UE beam pattern. For example, as discussed supra, the base station may specify (e.g., to the UE) a UE beam pattern for each of the candidate beams when the UE measures the reference signal. For example, as discussed supra, the base station may request the UE to try different UE beams (e.g., based on the UE beam pattern) when the base station is transmitting the reference signal, such that the UE may find a UE beam that provides the best signal quality (e.g., a UE beam with the highest signal strength) when used with a fallback beam of the base station. At 802, the base station continues to perform features of the flowchart 800 of FIG. 8.

Figure 10:
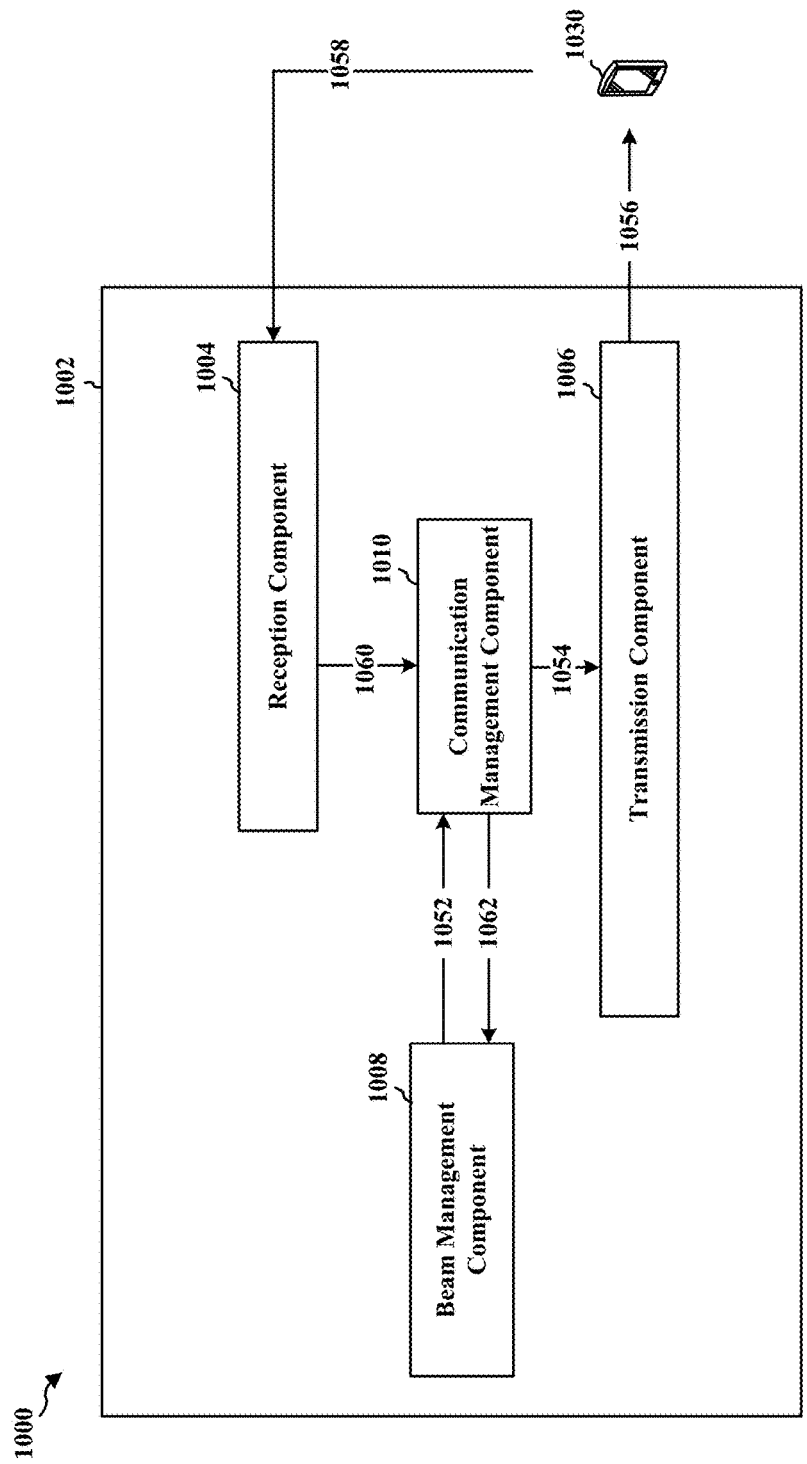
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a base station. The apparatus includes a reception component 1004, a transmission component 1006, a beam management component 1008, and a communication management component 1010.

The beam management component 1008 determines to change from a first beam to a second beam. The beam management component 1008 transmits, via the communication management component 1010 and the transmission component 1006, to a UE (e.g., UE 1030), a beam change instruction to indicate the determination to change to the second beam upon the determination to change to the second beam, at 1052, 1054, and 1056.

The beam management component 1008 determines whether the UE has received the beam change instruction (e.g., via the reception component 1004 and the communication management component 1010, at 1058, 1060, and 1062). In an aspect, the beam management component 1008 determines whether the UE has received the beam change instruction by: determining whether a NACK is received from the UE in response to the beam change instruction, and determining that the UE has not received the beam change instruction if the NACK is received. In such an aspect, the third beam is selected when a first duration expires after receiving the NACK.

In another aspect, the beam management component 1008 determines whether the UE has received the beam change instruction by: determining whether the UE and the base station are in a state disconnect, and determining that the UE has not received the beam change instruction if the UE and the base station are in the state disconnect. In such an aspect, the third beam is selected when a first duration expires after determining that the UE and the base station are in the state disconnect. In such an aspect, the UE and the base station are in the state disconnect if the base station has not received an acknowledgement from the UE in response to the beam change instruction regardless of whether the UE has sent the acknowledgement or not.

In another aspect, the beam management component 1008 determines whether the UE has received the beam change instruction by: determining whether the base station and the UE are able to communicate with each other via the second beam at least for a second duration, and determining that the UE has not received the beam change instruction if the base station is not able to communicate with each other via the second beam at least for the second duration.

The beam management component 1008 selects a third beam to communicate with the UE when the base station determines that the UE has not received the beam change instruction, where the third beam is a predefined fallback beam. In an aspect, the first beam is at least one of a first transmit beam or a first receive beam, the second beam is at least one of a second transmit beam or a second receive beam, and the fallback beam is at least one of a fallback transmit beam or a fallback receive beam.

In an aspect, a parameter value of a parameter of the third beam is different from a parameter value of the parameter of at least one of first/second beam. In an aspect, the parameter of the third beam may include at least one of a uplink power control offset, or aggregation level on a downlink control channel. In such an aspect, the parameter of the third beam may reflect at least one of the following: an uplink power control offset of the third beam being larger than an uplink power control offset of the second beam, or an aggregation level on a control channel for the third beam being higher than an aggregation level on a downlink control channel for the second beam. In an aspect, the parameter of the third beam may be configured via at least one of an RRC signaling or a downlink control channel. In an aspect, the parameter of the third beam may be updated as the fallback beam is updated with time.

In an aspect, the third beam is at least one of: a beam with a wider beam width than a beam width of the second beam, or a pseudo-omnidirectional beam at the UE. In another aspect, the third beam is same as the first beam.

In an aspect, the beam management component 1008 transmits, via the communication management component 1010 and the transmission component 1006, to the UE, at least one reference signal using a plurality of candidate beams, at 1052, 1054, and 1056. The beam management component 1008 receives, via the communication management component 1010 and the reception component 1004, an indication of the third beam from the UE based on UE reception quality of the at least one reference signal for each of the plurality of candidate beams, at 1058, 1060, and 1062.

In an aspect, the beam management component 1008 transmits, via the communication management component 1010 and the transmission component 1006, to the UE, at least one reference signal using a plurality of candidate beams, at 1052, 1054, and 1056. The beam management component 1008 receives, via the communication management component 1010 and the reception component 1004, from the UE, a signal quality report for at least one of the plurality of candidate beams based on the at least one reference signal, at 1058, 1060, and 1062. The beam management component 1008 selects a beam among the plurality of candidate beams as the third beam based on the signal quality report. In an aspect, the signal quality report comprises information on at least one of a beam identifier for each candidate beams, an SNR for each candidate beam, an SINR for each candidate beam, an RSRP for each candidate beam, a RSRQ, an RSSI for each candidate beam, or a CQI for each candidate beam. In an aspect, the at least one reference signal includes at least one of an secondary synchronization signal, a beam reference signal, a mobility reference signal, a CSI-RS, and a demodulation reference signal for a physical broadcast channel signal.

In an aspect, the beam management component 1008 may transmit, via the communication management component 1010 and the transmission component 1006, to the UE, a UE beam pattern for each of the candidate beams, where the signal quality report is further based on the UE beam pattern, at 1052, 1054, and 1056.

In an aspect, the beam management component 1008 determines that communication with the UE using the third beam fails. The beam management component 1008 performs a beam recovery procedure to select a fourth beam upon the determination that the communication using the third beam fails. In an aspect, the beam recovery procedure is based on at least one of a beam recovery request or a RACH.

In an aspect, the beam management component 1008 may perform the beam recovery procedure by: receiving, from the UE, a random access channel (RACH) signal that indicates the fourth beam, and selecting the fourth beam to communicate with the UE based on the RACH signal. In an aspect, the RACH signal is received if the UE is not time-synchronized with the base station. In an aspect, a resource for receiving the RACH signal is selected based on a resource of a downlink synchronization signal block.

In an aspect, the beam management component 1008 may perform the beam recovery procedure by: receiving, from the UE, a beam recovery request that indicates the fourth beam, and selecting the fourth beam to communicate with the UE based on the beam recovery request. In an aspect, the beam recovery request is received if the UE is not time-synchronized with the base station. In an aspect, the beam recovery request is received in a RACH subframe. In an aspect, a resource for receiving the beam recovery request is selected based on a resource of a downlink synchronization signal block.

Figure 9:
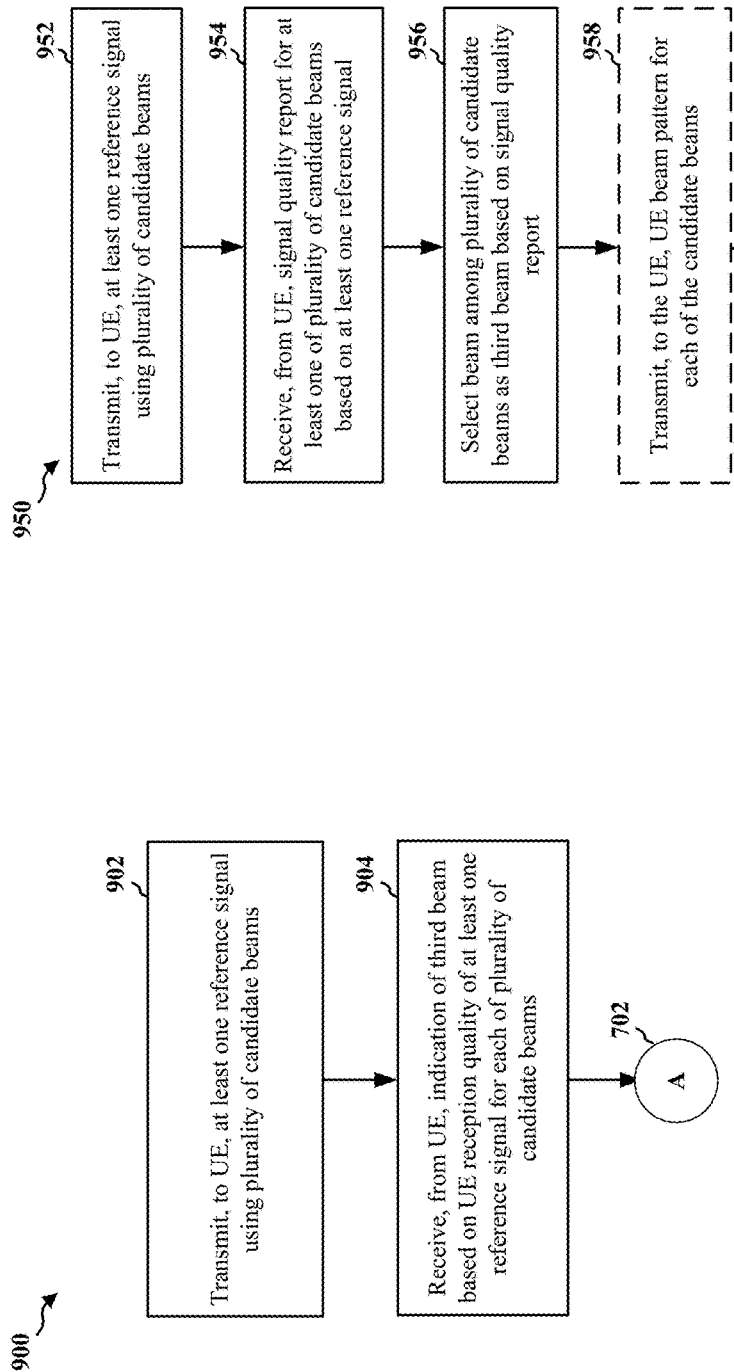
FIG. 9A is a flowchart of a method of wireless communication, expanding from the flowchart of FIG. 8.
FIG. 9B is a flowchart of a method of wireless communication, expanding from the flowchart of FIG. 8.

The apparatus may include additional components that perform each of the blocks of the algorithm in the aforementioned flowcharts of FIGS. 7-9. As such, each block in the aforementioned flowcharts of FIGS. 7-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
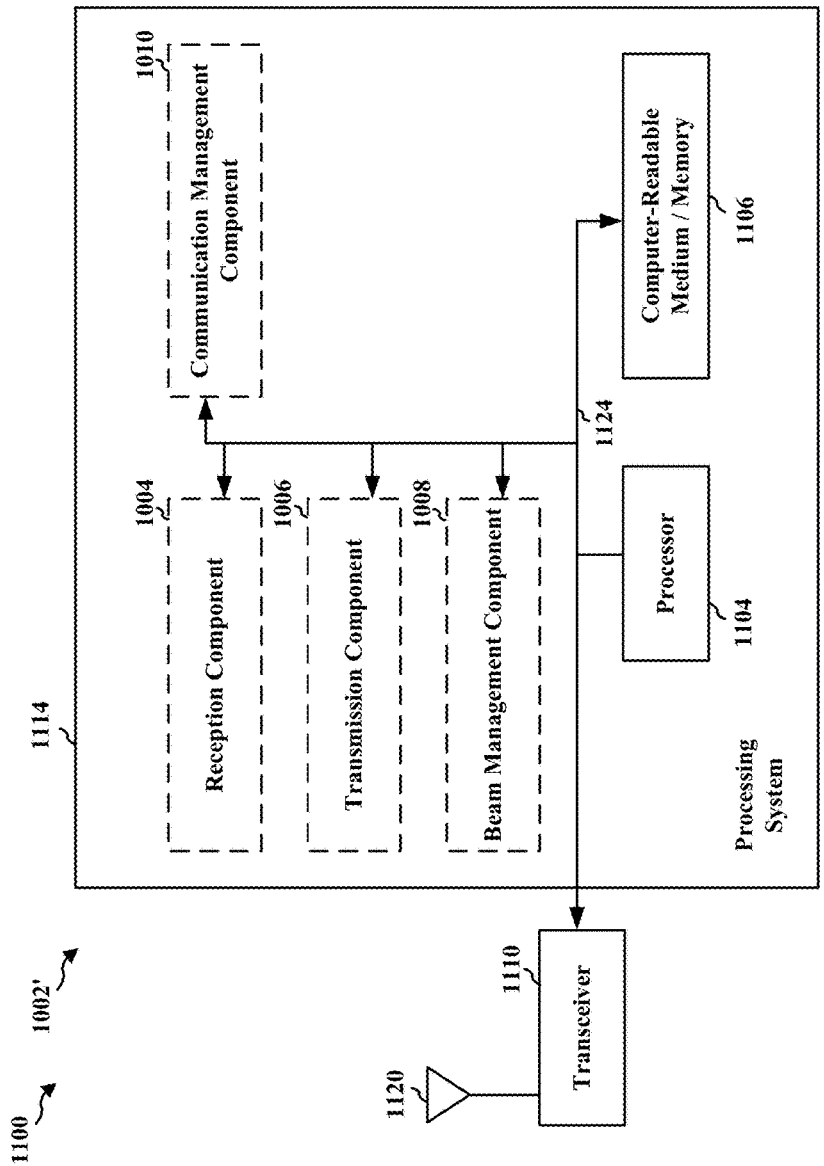
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010. The components may be software components running in the processor 1104, resident/stored in the computer readable medium/memory 1106, one or more hardware components coupled to the processor 1104, or some combination thereof. The processing system 1114 may be a component of the eNB 310 and may include the memory 376 and/or at least one of the TX processor 316, the RX processor 370, and the controller/processor 375.

In one configuration, the apparatus 1002/1002' (base station) for wireless communication includes means for determining to change from a first beam to a second beam, means for transmitting, to a UE, a beam change instruction to indicate the determination to change to the second beam upon the determination to change to the second beam, means for determining whether the UE has received the beam change instruction, and means for selecting a third beam to communicate with the UE when the base station determines that the UE has not received the beam change instruction, wherein the third beam is a predefined fallback beam. In an aspect, the apparatus 1002/1002' (base station) further includes means for transmitting, to the UE, at least one reference signal using a plurality of candidate beams, and means for receiving an indication of the third beam from the UE based on UE reception quality of the at least one reference signal for each of the plurality of candidate beams. In an aspect, the apparatus 1002/1002' (base station) further includes means for transmitting, to the UE, at least one reference signal using a plurality of candidate beams, means for receiving, from the UE, a signal quality report for at least one of the plurality of candidate beams based on the at least one reference signal, and means for selecting a beam among the plurality of candidate beams as the third beam based on the signal quality report. In such an aspect, the apparatus 1002/1002' (base station) further includes means for transmitting, to the UE, a UE beam pattern for each of the candidate beams, where the signal quality report is further based on the UE beam pattern.

In an aspect, the means for determining whether the UE has received the beam change instruction is configured to: determine whether a NACK is received from the UE in response to the beam change instruction, and determine that the UE has not received the beam change instruction if the NACK is received. In an aspect, the means for determining whether the UE has received the beam change instruction is configured to: determine whether the UE and the base station are in a state disconnect, and determine that the UE has not received the beam change instruction if the UE and the base station are in the state disconnect. In an aspect, the means for determining whether the UE has received the beam change instruction is configured to: determine whether the base station and the UE are able to communicate with each other via the second beam at least for a second duration, and determine that the UE has not received the beam change instruction if the base station is not able to communicate with each other via the second beam at least for the second duration.

In an aspect, the apparatus 1002/1002' (base station) further includes means for determining that communication with the UE using the third beam fails, and means for performing a beam recovery procedure to select a fourth beam upon the determination that the communication using the third beam fails. In an aspect, the means for performing the beam recovery procedure is configured to: receive, from the UE, a RACH signal that indicates the fourth beam, and select the fourth beam to communicate with the UE based on the RACH signal. In an aspect, the means for performing the beam recovery procedure is configured to: receive, from the UE, a beam recovery request that indicates the fourth beam, and select the fourth beam to communicate with the UE based on the beam recovery request.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 12:
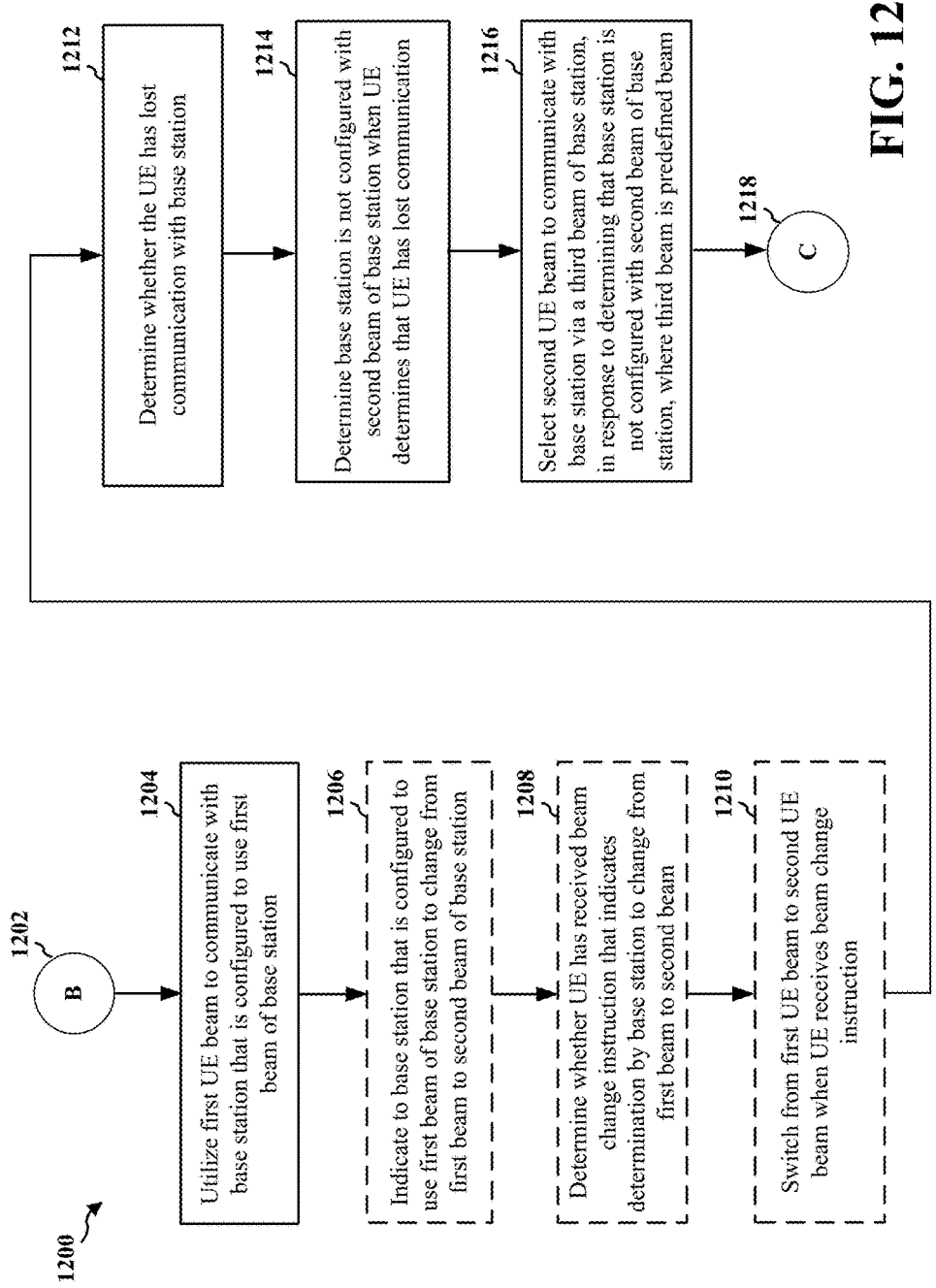
FIG. 12 is a flowchart of a method of wireless communication.

FIG. 12 is a flowchart 1200 of a method of wireless communication. The method may be performed by a UE (e.g., the UE 104, UE 702, the apparatus 1502/1502'). At 1202, the UE may continue from performing additional features, as discussed infra. At 1204, the UE utilizes a first UE beam to communicate with a base station that is configured to use a first beam of the base station. For example, as illustrated in FIG. 7, the base station 704 and the UE 702 may communicate with each other using a current beam of the base station 704 (e.g., a beam selected to communicate with the UE). In an aspect, at 1206, the UE may indicate to the base station that is configured to use the first beam of the base station to change from the first beam to the second beam. For example, as illustrated in FIG. 7, at 712, the UE 702 informs the base station 712 that the base station should change from the current beam to the second beam (e.g., by sending a beam change request to change from the current beam to the second beam).

In an aspect, at 1208, the UE may determine whether the UE has received a beam change instruction that indicates determination by the base station to change from the first beam to the second beam. At 1210, the UE may switch from the first UE beam to a second UE beam when the UE receives the beam change instruction. For example, as illustrated in FIG. 7, the UE 702 may determine whether the UE received the beam change instruction. In an aspect, for example, if the UE 702 has successfully received the beam change instruction, the UE 702 may switch to a second UE beam.

At 1212, the UE determines whether the UE has lost communication with the base station. For example, as illustrated in FIG. 7, at 724, the UE 702 may determine whether UE 702 has lost communication with the base station 704 (e.g., after the base station sends the beam change instruction at 718). In an aspect, the UE may determine that the UE has lost communication with the base station if the UE fails to communicate with the base station using the second UE beam after receiving the beam change instruction. For example, as illustrated in FIG. 7, the UE 702 may determine that the UE 702 has lost communication with the base station 704 if the UE 702 fails to communicate with the base station using the second UE beam after receiving the beam change instruction. In an aspect, the UE may determine that the UE has lost communication with the base station if the UE fails to successfully receive the beam change instruction that indicates determination by the base station to change from the first beam to the second beam and fails to communicate with the base station using the first UE beam. For example, as illustrated in FIG. 7, the UE 702 may determine that the UE 702 has lost communication with the base station 704 if the UE 702 fails to successfully receive the beam change instruction (and fails to communicate with the base station 704 using the first UE beam). In an aspect, the UE may determine that the UE has lost communication with the base station if the UE does not determine that the base station has received an acknowledgment of successful reception of a beam change instruction from the base station after the UE transmits the acknowledgment to the base station. For example, as illustrated in FIG. 7, the UE 702 may determine that the UE 702 has lost communication with the base station 704 if the UE 702 does not determine that the base station 704 has received an ACK of successful reception of the beam change instruction after the UE 702 transmits the ACK to the base station 704.

At 1214, the UE determines that the base station is not configured with a second beam of the base station when the UE determines that the UE has lost communication. For example, as illustrated in FIG. 7, if the UE 702 determines at 724 that the UE 702 lost communication with the base station 704, the UE 702 may determine that the base station is not configured with the second beam. At 1216, the UE selects a third UE beam to communicate with the base station via a third beam of the base station, in response to determining that the base station is not configured with the second beam of the base station, where the third beam is a predefined beam. For example, as illustrated in FIG. 7, upon determining that the base station is not configured with the second beam of the base station, the UE 702 may select a different UE beam to communicate with the base station 704 utilizing the fallback beam.

In an aspect, the first beam is at least one of a first transmit beam or a first receive beam, the second beam is at least one of a second transmit beam or a second receive beam, and the fallback beam is at least one of a fallback transmit beam or a fallback receive beam. For example, as discussed supra, the current beam may be a current receive beam and/or a current transmit beam at the base station, the second beam may be a second receive beam and/or a second transmit beam at the base station, and the fallback beam may be a receive beam and/or a transmit beam at the base station. At 1218, the UE may perform additional features, as discussed infra.

In an aspect, a parameter value for a parameter of the third beam may be different from a parameter value for the parameter of at least one of the first beam or the second beam. For example, as discussed supra, parameters for communication using the fallback beam may have different values from the parameters for communication using other beams (e.g., current beam, the second beam). In an aspect, the parameter of the third beam may include at least one of a uplink power control offset, or aggregation level on a downlink control channel. In such an aspect, the parameter of the third beam may reflect at least one of the following: an uplink power control offset of the third beam being larger than an uplink power control offset of the second beam, or an aggregation level on a control channel for the third beam being higher than an aggregation level on a downlink control channel for the second beam. For example, as discussed supra, the parameters for communication using the fallback beam may include at least one of a uplink power control offset, or aggregation level on a downlink control channel. For example, as discussed supra, a fallback beam may have a larger uplink power control offset. For example, as discussed supra, the aggregation level on a downlink control channel (e.g., PDCCH) for the fallback beam may be higher than the aggregation level on a downlink control channel (e.g., PDCCH) for other beams. In an aspect, the parameter of the third beam may be configured via at least one of an RRC signaling or a downlink control channel. In an aspect, the parameter of the third beam may be updated as the fallback beam may be updated with time. For example, as discussed supra, the parameters for communication using the fallback beam may be configured by RRC signaling and/or by a downlink control channel (e.g., PDCCH) and/or may be reconfigured if the fallback beam changes to another fallback beam or properties of the fallback beam change.

In an aspect, the third beam is at least one of: a beam with a wider beam width than a beam width of the second beam, or a pseudo-omnidirectional beam at the UE. For example, as discussed supra, the fallback beam may be a wide beam at the base station and/or may be a pseudo-omni beam (e.g., a beam with an angular range of 120 degrees) at the UE. In an aspect, the third beam may be same as the first beam. For example, as discussed supra, the fallback beam may be the current working beam (e.g., the current beam before beam switching). In an aspect, the third UE beam may be same as the first UE beam.

Figure 13:
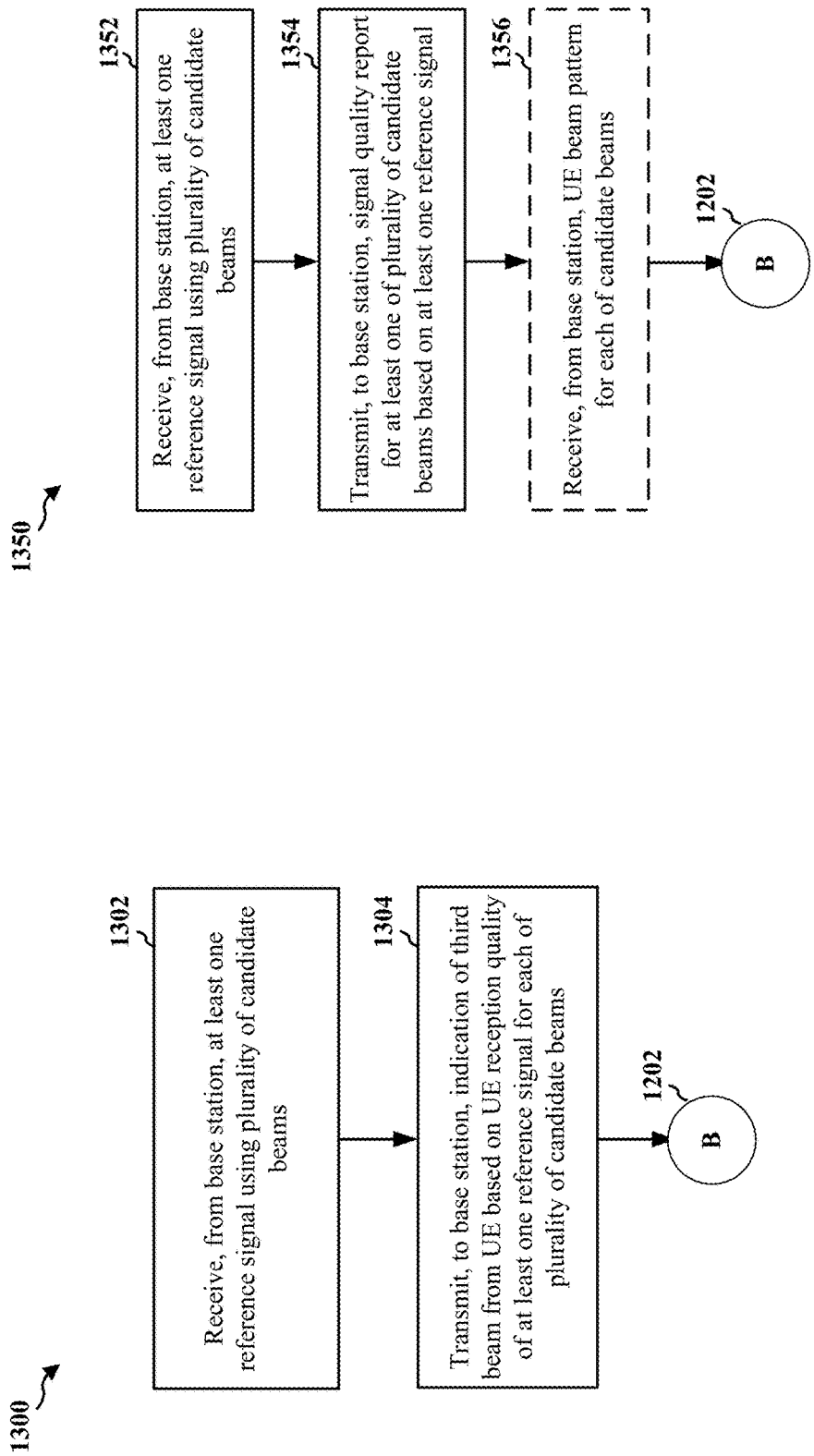
FIG. 13A is a flowchart of a method of wireless communication, expanding from the flowchart of FIG. 12.
FIG. 13B is a flowchart of a method of wireless communication, expanding from the flowchart of FIG. 12.

FIG. 13A is a flowchart 1300 of a method of wireless communication, expanding from the flowchart 1200 of FIG. 12. The method may be performed by a UE (e.g., the UE 104, UE 702, the apparatus 1502/1502'). At 1302, the UE receives, from the base station, at least one reference signal using a plurality of candidate beams. AT 1304, the UE transmits, to the base station, an indication of the third beam from the UE based on UE reception quality of the at least one reference signal for each of the plurality of candidate beams. For example, as discussed supra, the UE may make the measurements of the signal quality based on the signal quality of communication from the base station to the UE (e.g., based on signal quality of communication of a reference signal from the base station using the candidate fallback beams) and/or the signal quality of communication from the UE to the base station, using each beam pair (e.g., based on signal quality of communication of a reference signal to the base station using the candidate fallback beams). For example, as discussed supra, based on the measurement of each beam pair, the UE selects the best candidate fallback beam of the base station as a fallback beam that the base station may use to communicate with the UE. When the UE selects the fallback beam of the base station, the UE indicates to the base station the fallback beam of the base station (e.g., by transmitting a beam identifier of the fallback beam). At 1202, the base station continues to perform features of the flowchart 1200 of FIG. 12.

FIG. 13B is a flowchart 1350 of a method of wireless communication, expanding from the flowchart 1200 of FIG. 12. The method may be performed by a UE (e.g., the UE 104, UE 702, the apparatus 1502/1502'). At 1352, the UE receives, from the base station, at least one reference signal using a plurality of candidate beams. At 1354, the UE transmits, to the base station, a signal quality report for at least one of the plurality of candidate beams based on the at least one reference signal. In an aspect, the signal quality report is used to set a beam among the plurality of candidate beams as the third beam. For example, as discussed supra, a UE may measure the quality of candidate beams (e.g., reference beams) used by the base station to transmit reference signal(s) to the UE, where the quality of the each candidate beam is measured based on the reference signal(s), and may subsequently send a measurement report of the measurements of the quality of candidate beams to the base station, such that the base station may select a fallback beam out of the multiple candidate beams based on the measurement report.

In an aspect, the signal quality report comprises information on at least one of a beam identifier for each candidate beams, an SNR for each candidate beam, an SINR for each candidate beam, an RSRP for each candidate beam, an RSRQ, an RSSI for each candidate beam, or a CQI for each candidate beam. For example, as discussed supra, the measurement report of the quality of the reference signals may include information on at least one of a beam identifier for each candidate beam, an SNR for each candidate beam, an SINR for each candidate beam, an RSRP for each candidate beam, an RSRQ, an RSSI for each candidate beam, or a CQI for each candidate beam. In an aspect, the at least one reference signal includes at least one of an secondary synchronization signal, a beam reference signal, a mobility reference signal, a CSI-RS, and a demodulation reference signal for a physical broadcast channel signal. For example, as discussed supra, the reference signal may include one or more of an SSS, a BRS, a mobility reference signal, a CSI-RS, and a DMRS for a PBCH signal At 1356, the UE may receive, from the base station, a UE beam pattern for each of the candidate beams, where the signal quality report is further based on the UE beam pattern.

For example, as discussed supra, the base station may specify (e.g., to the UE) a UE beam pattern for each of the candidate beams when the UE measures the reference signal. For example, as discussed supra, the base station may request the UE to try different UE beams (e.g., based on the UE beam pattern) when the base station is transmitting the reference signal, such that the UE may find a UE beam that provides the best signal quality (e.g., a UE beam with the highest signal strength) when used with a fallback beam of the base station. At 1202, the base station continues to perform features of the flowchart 1200 of FIG. 12.

Figure 14:
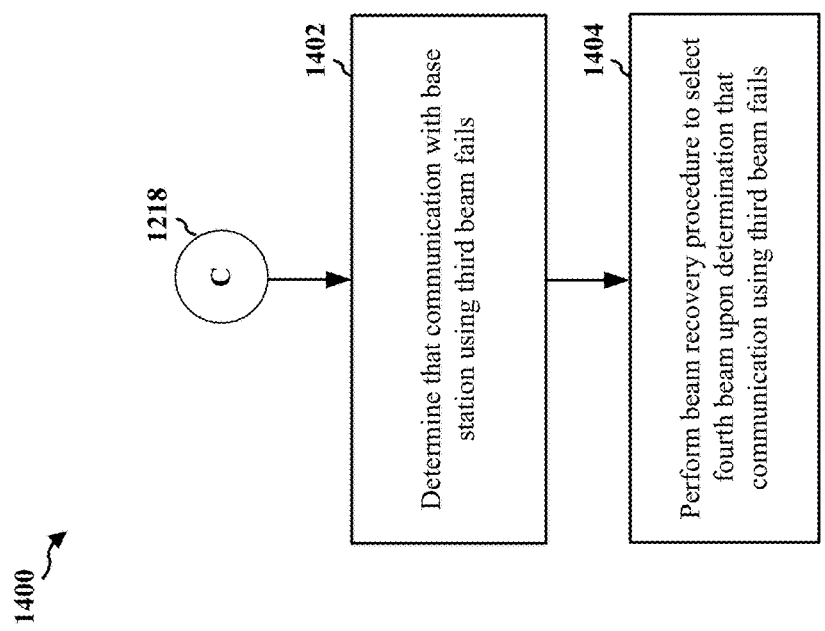
FIG. 14 is a flowchart of a method of wireless communication, expanding from the flowchart of FIG. 12.

FIG. 14 is a flowchart 1400 of a method of wireless communication, expanding from the flowchart 1200 of FIG. 12. The method may be performed by a UE (e.g., the UE 104, UE 702, the apparatus 1502/1502').

At 1218, the base station continues from the flowchart 1200 of FIG. 12. At 1402, the UE determines that communication with the base station using the third beam fails. At 1404, the UE performs a beam recovery procedure to select a fourth beam upon the determination that the communication using the third beam fails. For example, as discussed supra, when communication using the fallback beam fails for the base station and/or the UE, the UE and/or the base station may initiate a beam recovery procedure. In an aspect, the beam recovery procedure is based on at least one of a beam recovery request or a RACH. For example, as discussed supra, the beam recovery procedure may be based on a RACH signal and/or a beam recovery request.

In an aspect, the UE may perform the beam recovery procedure by: transmitting, to the base station, a RACH signal that indicates the fourth beam, where the RACH signal is used to select the fourth beam for the base station to communicate with the UE. For example, as discussed supra, according to one approach, the UE may transmit a RACH signal to the base station to indicate a recovery beam to the base station, such that the base station may select the recovery beam for communication with the UE. In an aspect, the RACH signal is transmitted if the UE is not time-synchronized with the base station. For example, as discussed supra, the UE may transmit a RACH signal to the base station if the UE is not time-synchronized with the base station. In an aspect, a resource for receiving the RACH signal at the base station is selected based on a resource of a downlink synchronization signal block. For example, as discussed supra, the base station may use a beam associated with the selected resource of the downlink synchronization signal block, as a recovery beam to communicate with the UE.

In an aspect, the UE may perform the beam recovery procedure by: transmitting, to the base station, a beam recovery request that indicates the fourth beam, where the beam recovery request is used to select the fourth beam for the base station to communicate with the UE. For example, as discussed supra, according to another approach, the UE may transmit a beam recovery request to the base station to indicate a recovery beam to the base station, such that the base station may select the recovery beam for communication with the UE. In an aspect, the beam recovery request is transmitted if the UE is not time-synchronized with the base station. For example, as discussed supra, the UE may transmit the beam recovery request to the base station if the UE is not time-synchronized with the base station. In an aspect, the beam recovery request is transmitted in a RACH subframe. For example, as discussed supra, the beam recovery request may be transmitted through a RACH subframe. In an aspect, a resource for receiving the beam recovery request at the base station is selected based on a resource of a downlink synchronization signal block. For example, as discussed supra, the resource selection for the beam recovery request may be based on a resource of a downlink synchronization signal block.

Figure 15:
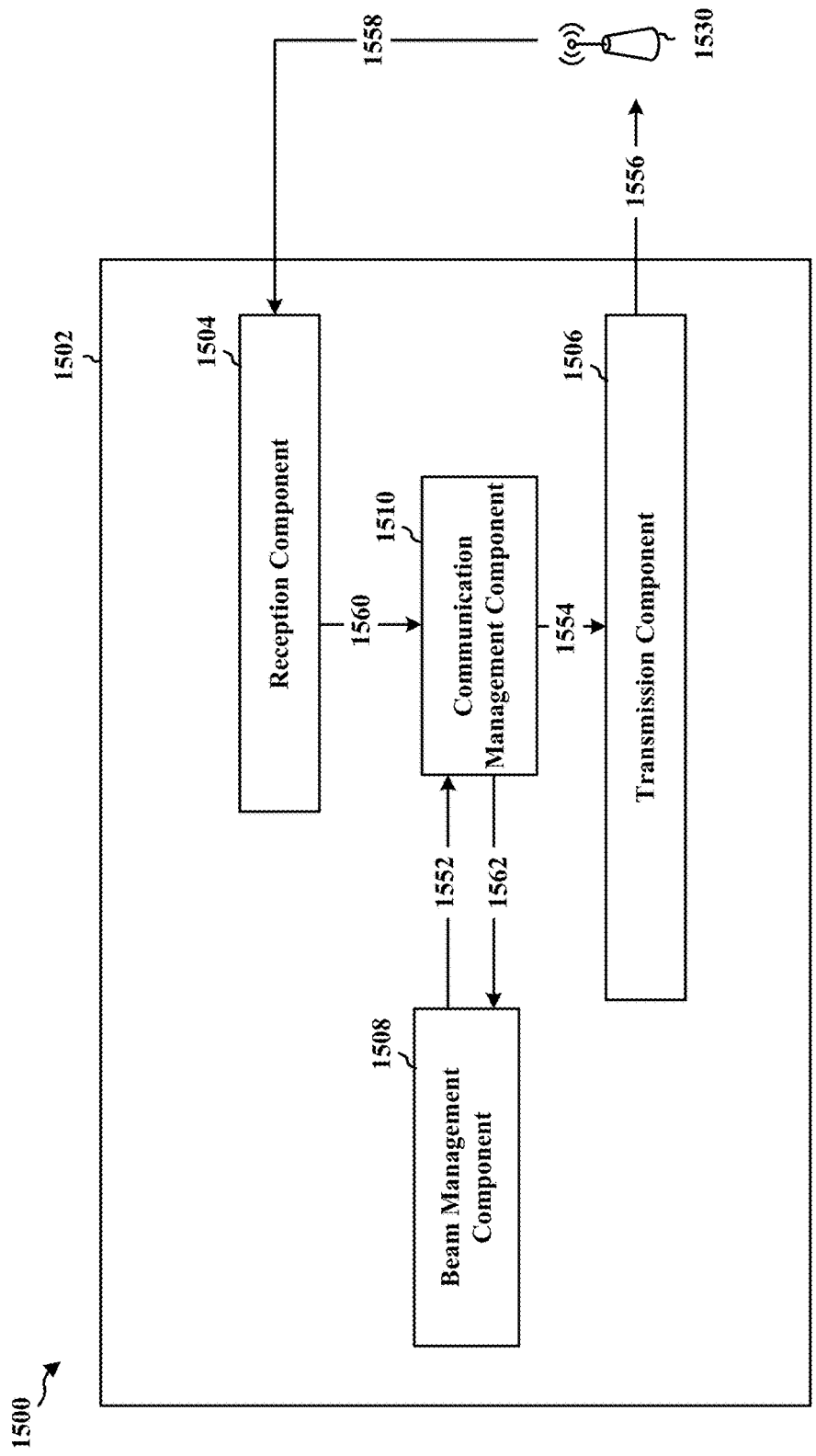
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus may be a UE. The apparatus includes a reception component 1504, a transmission component 1506, a beam management component 1508, and a communication management component 1510.

The beam management component 1508 utilizes a first UE beam to communicate with a base station that is configured to use a first beam of the base station (e.g., base station 1530) (e.g., via the communication management component 1510, the transmission component 1506, and the reception component 1504, at 1552, 1554, 1556, 1558, 1560, and 1562). In an aspect, the beam management component 1508 may indicate to the base station that is configured to use the first beam of the base station to change from the first beam to the second beam, via the transmission component 1506 and the communication management component 1510, at 1552, 1554, and 1556.

In an aspect, the beam management component 1508 may determine whether the UE has received a beam change instruction that indicates determination by the base station to change from the first beam to the second beam. The beam management component 1508 may switch from the first UE beam to a second UE beam when the UE receives the beam change instruction.

The beam management component 1508 determines whether the UE has lost communication with the base station. In an aspect, the beam management component 1508 determines that the UE has lost communication with the base station if the UE fails to communicate with the base station using the second UE beam after receiving the beam change instruction. In an aspect, the beam management component 1508 determines that the UE has lost communication with the base station if the UE fails to successfully receive the beam change instruction that indicates determination by the base station to change from the first beam to the second beam and fails to communicate with the base station using the first UE beam. In an aspect, the beam management component 1508 determines that the UE has lost communication with the base station if the UE does not determine that the base station has received an acknowledgment of successful reception of a beam change instruction from the base station after the UE transmits the acknowledgment to the base station. The beam management component 1508 determines that the base station is not configured with a second beam of the base station when the beam management component 1508 determines that the UE has lost communication. The beam management component 1508 selects a second UE beam to communicate with the base station via a third beam of the base station, in response to determining that the base station is not configured with the second beam of the base station, where the third beam is a predefined beam. In an aspect, the first beam is at least one of a first transmit beam or a first receive beam, the second beam is at least one of a second transmit beam or a second receive beam, and the fallback beam is at least one of a fallback transmit beam or a fallback receive beam.

In an aspect, a parameter value for a parameter of the third beam is different from a parameter value for the parameter of at least one of the first beam or the second beam. In an aspect, the parameter of the third beam include at least one of a uplink power control offset, or aggregation level on a downlink control channel. In such an aspect, the parameter of the third beam reflect at least one of the following: an uplink power control offset of the third beam being larger than an uplink power control offset of the second beam, or an aggregation level on a control channel for the third beam being higher than an aggregation level on a downlink control channel for the second beam. In an aspect, the parameter of the third beam are configured via at least one of a RRC signaling or a downlink control channel. In an aspect, the parameter of the third beam are updated as the fallback beam is updated with time.

In an aspect, the third beam is at least one of: a beam with a wider beam width than a beam width of the second beam, or a pseudo-omnidirectional beam at the UE. In another aspect, the third beam is same as the first beam.

In an aspect, the beam management component 1508 receives, via the reception component 1504 and the communication management component 1510, from the base station, at least one reference signal using a plurality of candidate beams, at 1558, 1560, and 1562. The beam management component 1508 transmits, via the transmission component 1506 and the communication management component 1510, to the base station, an indication of the third beam from the UE based on UE reception quality of the at least one reference signal for each of the plurality of candidate beams, at 1552, 1554, and 1556.

In an aspect, the beam management component 1508 receives, via the reception component 1504 and the communication management component 1510, from the base station, at least one reference signal using a plurality of candidate beams, at 1558, 1560, and 1562. The beam management component 1508 transmits, via the transmission component 1506 and the communication management component 1510, to the base station, a signal quality report for at least one of the plurality of candidate beams based on the at least one reference signal. In an aspect, the signal quality report is used to set a beam among the plurality of candidate beams as the third beam, at 1552, 1554, and 1556.

In an aspect, the signal quality report comprises information on at least one of a beam identifier for each candidate beams, an SNR for each candidate beam, an SINR for each candidate beam, an RSRP for each candidate beam, an RSRQ, a RSSI for each candidate beam, or a CQI for each candidate beam. In an aspect, the at least one reference signal includes at least one of an secondary synchronization signal, a beam reference signal, a mobility reference signal, a CSI-RS, and a demodulation reference signal for a physical broadcast channel signal.

In an aspect, the beam management component 1508 receives, via the reception component 1504 and the communication management component 1510, from the base station, a UE beam pattern for each of the candidate beams, where the signal quality report is further based on the UE beam pattern, at 1558, 1560, and 1562.

In an aspect, the beam management component 1508 determines via the communication management component 1510 that communication with the base station using the third beam fails. The beam management component 1508 performs a beam recovery procedure to select a fourth beam upon the determination that the communication using the third beam fails. In an aspect, the beam recovery procedure is based on at least one of a beam recovery request or a random access channel (RACH).

In an aspect, the beam management component 1508 may perform the beam recovery procedure by: transmitting, via the communication management component 1510 and the transmission component 1506, to the base station, a RACH signal that indicates the fourth beam, where the RACH signal is used to select the fourth beam for the base station to communicate with the UE. In an aspect, the RACH signal is transmitted if the UE is not time-synchronized with the base station. In an aspect, a resource for receiving the RACH signal at the base station is selected based on a resource of a downlink synchronization signal block.

In an aspect, the beam management component 1508 may perform the beam recovery procedure by: transmitting, via the communication management component 1510 and the transmission component 1506, to the base station, a beam recovery request that indicates the fourth beam, where the beam recovery request is used to select the fourth beam for the base station to communicate with the UE. In an aspect, the beam recovery request is transmitted if the UE is not time-synchronized with the base station. In an aspect, the beam recovery request is transmitted in a RACH subframe. In an aspect, a resource for receiving the beam recovery request at the base station is selected based on a resource of a downlink synchronization signal block The apparatus may include additional components that perform each of the blocks of the algorithm in the aforementioned flowcharts of FIGS. 12-14. As such, each block in the aforementioned flowcharts of FIGS. 12-14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
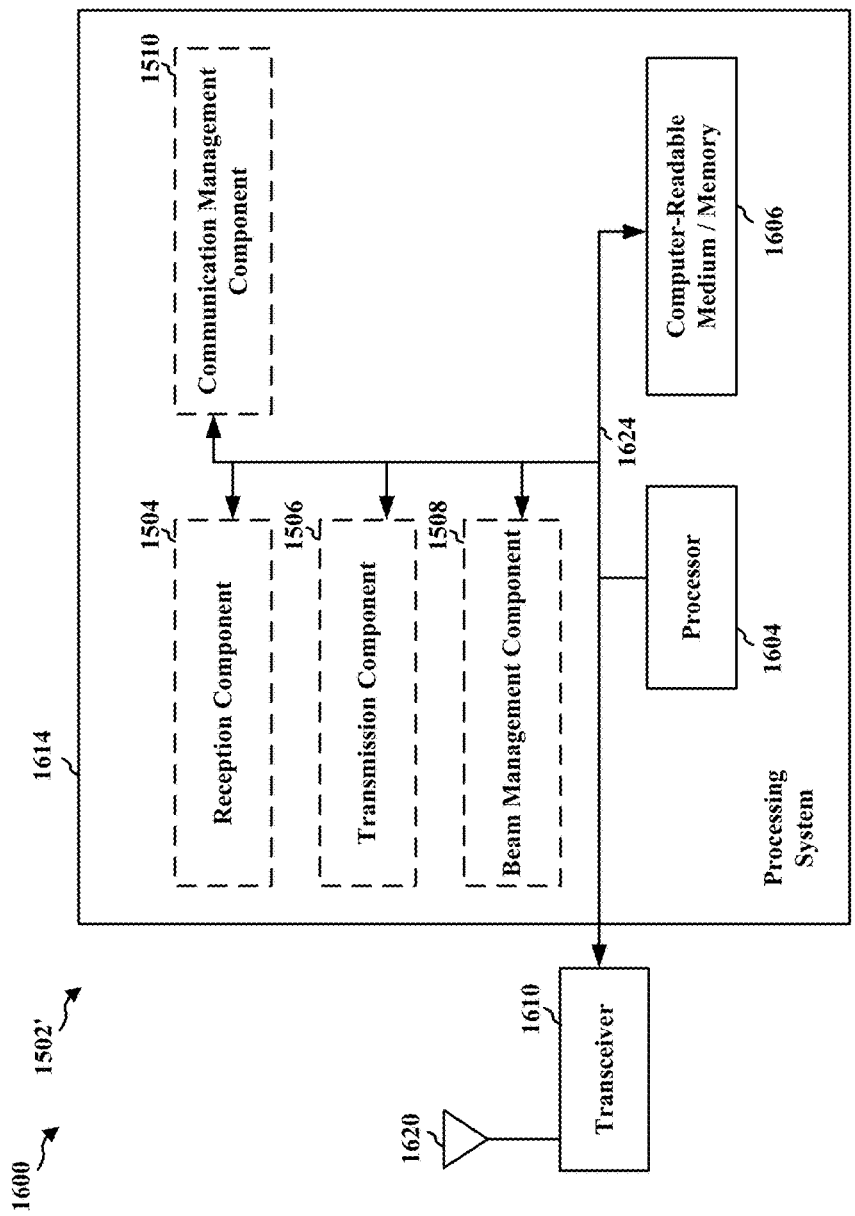
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1506, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510. The components may be software components running in the processor 1604, resident/stored in the computer readable medium/memory 1606, one or more hardware components coupled to the processor 1604, or some combination thereof. The processing system 1614 may be a component of the UE 350 and may include the memory 360 and/or at least one of the TX processor 368, the RX processor 356, and the controller/processor 359.

In one configuration, the apparatus 1502/1502' (UE) for wireless communication includes means for utilizing a first UE beam to communicate with a base station that is configured to use a first beam of the base station, means for determining whether the UE has lost communication with the base station, means for determining that the base station is not configured with a second beam of the base station when the UE determines that the UE has lost communication, and means for selecting a third UE beam to communicate with the base station via a third beam of the base station, in response to determining that the base station is not configured with the second beam of the base station, wherein the third beam is a predefined beam. In an aspect, the apparatus 1502/1502' includes means for determining whether the UE has received a beam change instruction that indicates determination by the base station to change from the first beam to the second beam, and means for switching from the first UE beam to a second UE beam when the UE receives the beam change instruction. In an aspect, the means for determining that the UE has lost communication is configured to determine that the UE has lost communication with the base station if the UE fails to communicate with the base station using the second UE beam after receiving the beam change instruction. In an aspect, the means for determining that the UE has lost communication is configured to determine that the UE has lost communication with the base station if the UE fails to successfully receive the beam change instruction that indicates determination by the base station to change from the first beam to the second beam and fails to communicate with the base station using the first UE beam. In an aspect, the means for determining that the UE has lost communication is configured to determine that the UE has lost communication with the base station if the UE does not determine that the base station has received an acknowledgment of successful reception of a beam change instruction from the base station after the UE transmits the acknowledgment to the base station. In an aspect, the apparatus 1502/1502' (UE) may further include means for indicating to the base station that is configured to use the first beam of the base station to change from the first beam to the second beam. In an aspect, the apparatus 1502/1502' (UE) may further include means for receiving, from the base station, at least one reference signal using a plurality of candidate beams, and means for transmitting, to the base station, an indication of the third beam from the UE based on UE reception quality of the at least one reference signal for each of the plurality of candidate beams. In an aspect, the apparatus 1502/1502' (UE) may further include means for receiving, from the base station, at least one reference signal using a plurality of candidate beams, means for transmitting, to the base station, a signal quality report for at least one of the plurality of candidate beams based on the at least one reference signal, where the signal quality report is used to set a beam among the plurality of candidate beams as the third beam. In such an aspect, the apparatus 1502/1502' (UE) may further include means for receiving, from the base station, a UE beam pattern for each of the candidate beams, where the signal quality report is further based on the UE beam pattern.

In an aspect, the apparatus 1502/1502' (UE) may further include means for determining that communication with the base station using the third beam fails, and means for performing a beam recovery procedure to select a fourth beam upon the determination that the communication using the third beam fails. In an aspect, the means for performing the beam recovery procedure is configured to: transmit, to the base station, a random access channel (RACH) signal that indicates the fourth beam, wherein the RACH signal is used to select the fourth beam for the base station to communicate with the UE. In an aspect, the means for performing the beam recovery procedure is configured to: transmit, to the base station, a beam recovery request that indicates the fourth beam, where the beam recovery request is used to select the fourth beam for the base station to communicate with the UE.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a base station, comprising:
    determining to change from a first beam to a second beam;
    transmitting, to a user equipment (UE), a beam change instruction to indicate the determination to change to the second beam upon the determination to change to the second beam;
    determining whether the UE has received the beam change instruction;
    selecting a third beam to communicate with the UE when the base station determines that the UE has not received the beam change instruction, wherein the third beam is a predefined beam.

2. The method of claim 1, wherein a parameter value for a parameter of the third beam is different from a parameter value for the parameter of at least one of the first beam or the second beam, and wherein the parameter of the third beam includes at least one of a uplink power control offset, or aggregation level on a downlink control channel.

3. The method of claim 2, wherein the parameter of the third beam reflects at least one of the following:
    an uplink power control offset of the third beam being larger than an uplink power control offset of the second beam, or
    an aggregation level on a control channel for the third beam being higher than an aggregation level on a downlink control channel for the second beam.

4. The method of claim 2, wherein the parameter of the third beam is configured based on at least one of a radio resource control (RRC) signaling or a downlink control channel.

5. The method of claim 1, wherein the third beam is same as the first beam.

6. The method of claim 1, further comprising:
    transmitting, to the UE, at least one reference signal using a plurality of candidate beams; and
    receiving an indication of the third beam from the UE based on UE reception quality of the at least one reference signal for each of the plurality of candidate beams.

7. The method of claim 1, further comprising:
    transmitting, to the UE, at least one reference signal using a plurality of candidate beams;
    receiving, from the UE, a signal quality report for at least one of the plurality of candidate beams based on the at least one reference signal; and
    selecting a beam among the plurality of candidate beams as the third beam based on the signal quality report.

8. The method of claim 7, further comprising:
    transmitting, to the UE, a UE beam pattern for each of the plurality of candidate beams,
    wherein the signal quality report is further based on the UE beam pattern.

9. The method of claim 1, wherein the determining whether the UE has received the beam change instruction comprises at least one of:

determining whether a negative acknowledgment (NACK) is received from the UE in response to the beam change instruction, and determining that the UE has not received the beam change instruction if the NACK is received; or determining whether the UE and the base station are in a state disconnect, and determining that the UE has not received the beam change instruction if the UE and the base station are in the state disconnect.

10. The method of claim 9, wherein the third beam is selected when at least one of following conditions is satisfied:
    a first duration expiring after receiving the NACK, or
    the first duration expiring after determining that the UE and the base station are in the state disconnect.

11. The method of claim 1, wherein the determining whether the UE has received the beam change instruction comprises:
    determining whether the base station and the UE are able to communicate with each other via the second beam at least for a second duration; and
    determining that the UE has not received the beam change instruction if the base station is not able to communicate with each other via the second beam at least for the second duration.

12. The method of claim 1, further comprising:
    determining that communication with the UE using the third beam fails; and
    performing a beam recovery procedure to select a fourth beam upon the determination that the communication using the third beam fails.

13. A method of wireless communication by a user equipment (UE), comprising:
    utilizing a first UE beam to communicate with a base station that is configured to use a first beam of the base station;
    determining whether the UE has lost communication with the base station;
    determining that the base station is not configured with a second beam of the base station when the UE determines that the UE has lost communication; and
    selecting a third UE beam to communicate with the base station via a third beam of the base station, in response to determining that the base station is not configured with the second beam of the base station, wherein the third beam is a predefined beam.

14. The method of claim 13, further comprising:
    indicating to the base station that is configured to use the first beam of the base station to change from the first beam to the second beam.

15. The method of claim 13, further comprising:
    determining whether the UE has received a beam change instruction that indicates determination by the base station to change from the first beam to the second beam; and
    switching from the first UE beam to a second UE beam when the UE receives the beam change instruction.

16. The method of claim 15, wherein the UE determines that the UE has lost communication with the base station if at least one of following conditions is satisfied:
    the UE failing to communicate with the base station using the second UE beam after receiving the beam change instruction,
    the UE failing to successfully receive a beam change instruction that indicates determination by the base station to change from the first beam to the second beam and failing to communicate with the base station using the first UE beam, or the UE not determining that the base station has received an acknowledgment of successful reception of the beam change instruction from the base station after the UE transmits the acknowledgment to the base station.

17. The method of claim 13, wherein the third UE beam is same as the first UE beam.

18. The method of claim 13, further comprising:

receiving, from the base station, at least one reference signal using a plurality of candidate beams; and transmitting, to the base station, an indication of the third beam from the UE based on UE reception quality of the at least one reference signal for each of the plurality of candidate beams.

19. The method of claim 13, further comprising:

receiving, from the base station, at least one reference signal using a plurality of candidate beams;

transmitting, to the base station, a signal quality report for at least one of the plurality of candidate beams based on the at least one reference signal, wherein the signal quality report is used to set a beam among the plurality of candidate beams as the third beam.

20. The method of claim 19, further comprising:

receiving, from the base station, a UE beam pattern for each of the plurality of candidate beams, wherein the signal quality report is further based on the UE beam pattern.

21. The method of claim 13, further comprising:

determining that communication with the base station using the third beam fails; and performing a beam recovery procedure to select a fourth beam upon the determination that the communication using the third beam fails.

22. A base station for wireless communication, comprising:

a memory; and at least one processor coupled to the memory and configured to:

determine to change from a first beam to a second beam;

transmit, to a user equipment (UE), a beam change instruction to indicate the determination to change to the second beam upon the determination to change to the second beam;

determine whether the UE has received the beam change instruction; and select a third beam to communicate with the UE when the base station determines that the UE has not received the beam change instruction, wherein the third beam is a predefined beam.

23. The base station of claim 22, wherein the at least one processor is further configured to:

transmit, to the UE, at least one reference signal using a plurality of candidate beams; and receive an indication of the third beam from the UE based on UE reception quality of the at least one reference signal for each of the plurality of candidate beams.

24. The base station of claim 22, wherein the at least one processor is further configured to:

transmit, to the UE, at least one reference signal using a plurality of candidate beams;

receive, from the UE, a signal quality report for at least one of the plurality of candidate beams based on the at least one reference signal; and select a beam among the plurality of candidate beams as the third beam based on the signal quality report.

25. The base station of claim 24, wherein the at least one processor is further configured to:

transmit, to the UE, a UE beam pattern for each of the candidate beams, wherein the signal quality report is further based on the UE beam pattern.

26. A user equipment (UE) for wireless communication, comprising:

a memory; and at least one processor coupled to the memory and configured to:

utilize a first UE beam to communicate with a base station that is configured to use a first beam of the base station;

determine whether the UE has lost communication with the base station;

determine that the base station is not configured with a second beam of the base station when the UE determines that the UE has lost communication; and select a third UE beam to communicate with the base station via a third beam of the base station, in response to determining that the base station is not configured with the second beam of the base station, wherein the third beam is a predefined beam.

27. The UE of claim 26, wherein the at least one processor is further configured to:

determine whether the UE has received a beam change instruction that indicates determination by the base station to change from the first beam to the second beam; and switch from the first UE beam to a second UE beam when the UE receives the beam change instruction.

28. The UE of claim 26, wherein the at least one processor is further configured to:

receive, from the base station, at least one reference signal using a plurality of candidate beams; and transmit, to the base station, an indication of the third beam from the UE based on UE reception quality of the at least one reference signal for each of the plurality of candidate beams.

29. The UE of claim 26, wherein the at least one processor is further configured to:

receive, from the base station, at least one reference signal using a plurality of candidate beams;

transmit, to the base station, a signal quality report for at least one of the plurality of candidate beams based on the at least one reference signal, wherein the signal quality report is used to set a beam among the plurality of candidate beams as the third beam.

30. The UE of claim 29, wherein the at least one processor is further configured to:

receive, from the base station, a UE beam pattern for each of the candidate beams, wherein the signal quality report is further based on the UE beam pattern.

* * * * *